(12) United States Patent
Zhao et al.

(10) Patent No.: US 12,620,634 B2
(45) Date of Patent: May 5, 2026

(54) PREDICTIVE THERMAL MODELS FOR CURRENT AND POWER CAPABILITY ESTIMATION

(71) Applicant: A123 Systems LLC, Novi, MI (US)

(72) Inventors: Wei Zhao, Novi, MI (US); Yufeng Liu, Northville, MI (US); Shawn Zhang, Novi, MI (US)

(73) Assignee: A123 SYSTEMS LLC, Novi, MI (US)

( * ) Notice: Subject to any disclaimer, the term of this patent is extended or adjusted under 35 U.S.C. 154(b) by 418 days.

(21) Appl. No.: 17/339,654

(22) Filed: Jun. 4, 2021

(65) Prior Publication Data

US 2021/0384559 A1 Dec. 9, 2021

Related U.S. Application Data

(60) Provisional application No. 63/036,916, filed on Jun. 9, 2020.

(51) Int. Cl.
  *H01M 10/48* (2006.01)
  *H01M 10/42* (2006.01)
(52) U.S. Cl.
  CPC ....... *H01M 10/425* (2013.01); *H01M 10/486* (2013.01); *H01M 2010/4271* (2013.01); *H01M 2220/20* (2013.01)
(58) Field of Classification Search
  CPC ............. H01M 10/425; H01M 10/486; H01M 2010/4271; H01M 2220/20; Y02E 60/10
  See application file for complete search history.

(56) References Cited

U.S. PATENT DOCUMENTS

| 8,489,264 B2 | 7/2013 | Morita et al. |
| 8,529,125 B2 | 9/2013 | Leutheuser et al. |

(Continued)

FOREIGN PATENT DOCUMENTS

DE 102017202358 A1 * 8/2018

OTHER PUBLICATIONS

Kuphaldt, Tony R. "All about Circuits-Chap 12. The physics of conductors and insulators-Temperature coefficient of resistance." www.Allaboutcircuts.com (2003), retrieved from https://www.allaboutcircuits.com/ Date: Aug. 18, 2023 (Year: 2003).*

(Continued)

*Primary Examiner* — Tiffany Legette
*Assistant Examiner* — Jared Hansen
(74) *Attorney, Agent, or Firm* — McCoy Russell LLP

(57) ABSTRACT

Methods and systems are provided for predictive thermal models for determining current and power capabilities of battery components of a battery-powered system. In one example, a method may include measuring a reference temperature of a first component of the battery-powered system, correlating a target temperature of a second component of the battery-powered system to the reference temperature, determining a maximum current manageable by the second component over a predetermined duration based on the target temperature, and responsive to an actual current at the second component being requested greater than the maximum current during the predetermined duration, adjusting one or more operating conditions of the battery-powered system to maintain the actual current below the maximum current. In some examples, the first component may be different from the second component. In this way, the methods and systems provided herein may mitigate overheating in a battery-powered system by altering an operating state thereof.

8 Claims, 10 Drawing Sheets

(56) References Cited

U.S. PATENT DOCUMENTS

| | | | | |
|---|---|---|---|---|
| 8,775,105 | B2 | 7/2014 | Lin et al. | |
| 9,071,072 | B2 | 6/2015 | Tamezane | |
| 9,457,682 | B2 | 10/2016 | Twarog et al. | |
| 9,496,586 | B1 | 11/2016 | Jung | |
| 10,059,222 | B2 | 8/2018 | He | |
| 10,230,137 | B2 | 3/2019 | Lin et al. | |
| 2012/0200257 | A1* | 8/2012 | Schwarz | H01M 10/486 |
| | | | | 320/109 |
| 2014/0199569 | A1* | 7/2014 | Sisk | B60L 3/0046 |
| | | | | 429/90 |
| 2015/0037616 | A1* | 2/2015 | Wyatt | H01M 50/296 |
| | | | | 429/153 |
| 2016/0144736 | A1* | 5/2016 | Trinkert | H01M 10/486 |
| | | | | 702/63 |
| 2017/0033417 | A1* | 2/2017 | Basu | F28D 15/00 |
| 2017/0242078 | A1* | 8/2017 | Kuper | H02J 7/005 |
| 2017/0305291 | A1* | 10/2017 | Koh | B60L 53/20 |
| 2021/0151811 | A1* | 5/2021 | Damgaard | H01M 10/613 |

OTHER PUBLICATIONS

DE102017202358a1, Hartung, R., "Method and Device for Operating an Electrochemical Energy Storage", machine English translation retrieved from https://worldwide.espacenet.com/ Date: Aug. 18, 2023 (Year: 2018).*

Richardson, Robert R., Peter T. Ireland, and David A. Howey. "Battery internal temperature estimation by combined impedance and surface temperature measurement." Journal of Power Sources 265 (2014): 254-261 (Year: 2014).*

Hussain, Sadam, et al. "A real-time bi-adaptive controller-based energy management system for battery-supercapacitor hybrid electric vehicles." Energies 12.24 (2019): 4662 (Year: 2019).*

Vinke, Heinz, et al. "Compact models for accurate thermal characterization of electronic parts." IEEE Transactions on Components, Packaging, and Manufacturing Technology: Part A 20.4 (2002): 411-419 (Year: 2002).*

Dees, D. et al., "Analysis of the Galvanostatic Intermittent Titration Technique (GITT) as applied to a lihtium-ion porous electrode," Journal of Power Sources, vol. 189, vol. 1, Apr. 1, 2009, 6 pags.

Belt, J., "Battery Test Manual for Plug-In Hybrid Electric Vehicles," Idaho National Laboratory (INL), No. INL/EXT-07-12536, Sep. 2010, 70 pages.

Walker, L., "Battery Test Manual for 48 Volt Mild Hybrid Electric Vehicles," Idaho National Laboratory (INL), No. NL/EXT-15-36567, Mar. 2017, 70 pages.

* cited by examiner

200

600

START

602
Receive $V_{battery,now}$, $I_{now}$, and $I_{max}$

604
Estimate $SOC_{now}$

606
Determine $V_{OCV,now}$ based on $SOC_{now}$

608
Determine $SOC_{end}$ based on $I_{max}$ and $SOC_{now}$

610
Determine $V_{OCV,end}$ based on $SOC_{end}$

612
Determine $V_{battery,end}$ based on $V_{battery,now}$, $I_{now}$, $I_{max}$, $V_{OCV,now}$, and $V_{OCV,end}$

RETURN

PREDICTIVE THERMAL MODELS FOR CURRENT AND POWER CAPABILITY ESTIMATION

CROSS REFERENCE TO RELATED APPLICATIONS

The present application claims priority to U.S. Provisional Application No. 63/036,916, entitled "PREDICTIVE THERMAL MODELS FOR CURRENT AND POWER CAPABILITY ESTIMATION," and filed on Jun. 9, 2020. The entire contents of the above-identified application are hereby incorporated by reference for all purposes.

FIELD

The present description relates generally to predictive thermal models, particularly for determining current and power capabilities in a battery system including a secondary battery cell.

BACKGROUND AND SUMMARY

Lithium-ion battery packs are increasingly sought after for high-power applications, such as electric, plug-in hybrid-electric, and mild hybrid-electric vehicles. In such battery systems, high currents may pass through various electrical and electronics components therein due to high power demands from the vehicle. In some examples, such high currents may result in overheating and degradation of one or more of the electrical and electronics components. Accordingly, accurate current and power capability estimation is desirable in high-power battery systems.

Monitoring dynamic temperature fluctuations in battery systems may permit such accurate estimation of current and power capabilities. Temperature monitoring may be realized via one or more temperature sensors placed in locations having a large enough surface area for a given temperature sensor, having particular criticality to battery operation, and where the given temperature sensor may be unlikely to be damaged.

As a first example, the temperature sensor may be placed on a body of a battery cell to monitor a cell temperature. However, overheating may occur in other portions of the battery cell which may be less accessible for placement of the temperature sensor, such as an electrode tab of the battery cell. For instance, in a lithium-ion pouch cell, high current may result in an electrode tab of the lithium-ion pouch cell being heated faster in than a body of the lithium-ion pouch cell. In some examples, such electrode tab overheating may result in reduced functionality of the lithium-ion pouch cell. As one example, an overheated electrode tab may melt a pouch casing of the lithium-ion pouch cell, potentially resulting in electrolyte leakage.

As a second example, the temperature sensor may be placed on a surface of a printed circuit board (PCB) to monitor a temperature of a battery management system (BMS). However, power electronics components on the PCB, such as metal-oxide-semiconductor field-effect transistor (MOSFET) and relay switches, may be less accessible for placement of the temperature sensor. Heating of (un-monitored) individual power electronics components may outpace heating of the (monitored) PCB surface, resulting in faster degradation of the individual power electronics components relative to the PCB surface.

To account for differences in temperatures and heating rates, a measured temperature at a monitored physical location may be correlated with an unmeasured temperature at an unmonitored physical location. For example, a complex thermal diffusion model may be implemented in a BMS of a battery system to estimate an internal temperature of a battery component based on a measured external temperature thereof.

The inventors herein have recognized potential issues with such models. As one example, BMS controllers, on which the thermal diffusion models may be implemented, may be limited in computational and memory resources. The algorithms known in the art to accurately model internal temperatures in battery systems are computationally taxing and utilize many empirical parameters, each of which may first be fit to experimental data tailored to a given application. Extensive testing may therefore be a prerequisite before acquisition of accurate results is possible.

Further, algorithms for modeling of internal temperatures may not be generalizable to determining temperatures of arbitrary components in the battery system. Specifically, such algorithms may assume thermal conduction is the sole mechanism of heat transfer (as may be the case between an external cell body and a cell interior, for example). However, for some thermally connected pairs of battery components, other factors may influence heat transfer therebetween. A generalized algorithm may account for such factors by including as inputs thermal properties of a given pair of battery components, such as thermal conductivity and thermal capacitance. However, though such properties may be relatively easy to measure for some battery components, such as a battery cell body, for other components, such as electrode tabs, there may be significant difficulty in obtaining accurate measurements.

Additionally, once such unmeasured temperatures have been estimated, no method exists for determining current and power capabilities therefrom and then adjusting battery operation accordingly. Accordingly, a determination of overheating at a given battery component may be countered by an additional cooling system instead of addressing a root cause of the overheating, such as excessive current or voltage burdens on the given battery component.

The inventors have identified the above problems and have determined solutions to at least partially solve them. In one example, an effective current $I_{eff}$ and a reference temperature $T_{ref}$ of a first component in a battery system may be determined and employed to predict a target temperature $T_{target}$ of a second component by way of the following generalized equation:

$$T_{target} = T_{ref} + \alpha I_{eff}^2 \tag{1}$$

where $\alpha$ is an empirical coefficient.

$T_{target}$ may then be used in a predictive thermal model to determine a maximum current $I_{max}$ of the second component of the battery system, where the predictive thermal model may be structured around a single differential equation:

$$C_m \frac{dT_{target}}{dt} = I_{max}^2 R_e + \frac{T_{amb} - T_{target}}{R_t} \tag{2}$$

where $C_m$ is a thermal capacity of the second component, t is time, $T_{amb}$ is a temperature of an ambient environment of the battery system, $R_e$ is an electrical resistance of the second component, and $R_t$ is a thermal resistance between the second component and the ambient environment.

A maximum power $P_{max}$ may then be determined by inputting $I_{max}$ into an equivalent circuit model, which may provide a terminal voltage $V_{battery,end}$ following a time pulse $t_p$. Specifically, $P_{max}$ may be the product of $I_{max}$ and $V_{battery,end}$. If an actual current at the second component or an actual power at the second component is requested which surpasses $I_{max}$ or $P_{max}$, respectively, then one or more operating conditions of the battery system may be adjusted. In this way, a generalized predictive thermal model may be implemented in a battery system based on relatively few empirical parameters fit to battery operation testing data. Further, often difficult-to-measure physical material properties such as thermal conductivity and thermal capacitance may not be directly determined, but may instead be accounted for via already included empirical parameters. As such, the battery system may also mitigate overheating of unmonitored (that is, not directly monitored) components therein by calibrating the one or more operating conditions predicted to cause the overheating.

In one example, a method may include measuring a reference temperature of a first component of a battery-powered system, correlating a target temperature of a second component of the battery-powered system to the reference temperature, determining a maximum current manageable by the second component over a predetermined duration based on the target temperature, and responsive to an actual current at the second component being requested greater than the maximum current during the predetermined duration, adjusting one or more operating conditions of the battery-powered system to maintain the actual current below the maximum current. In this way, a method for mitigating overheating in a battery-powered system may be generalized to any two components of the battery-powered system having a thermal connection therebetween.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for predictive thermal modeling of battery systems powered by one or more secondary battery cells and estimation of current (e.g., electric current) and power capabilities therefrom. In one example, a battery system may include a battery management system (BMS) electrically coupled to a battery pack having one or more lithium-ion battery cells. A temperature of a first component of the battery system may be directly measured via a temperature sensor positioned thereat. The temperature of the first component may be employed to monitor a temperature of a second component, the second component not having any temperature sensor positioned thereat.

The temperature of the second component may be input into a predictive thermal model implemented on the BMS. In some examples, the predictive thermal model may be based on a first-order ordinary differential equation (ODE), whereby the first-order ODE may be solved for a maximum current manageable by the second component over a predetermined duration. The maximum current may be used to determine a maximum power manageable by the second component over the predetermined duration.

If an actual current or an actual power at the second component is requested which exceeds the maximum current or the maximum power, respectively, then one or more operating conditions of the battery system may be adjusted to mitigate, or substantially avoid, overheating of the second component ("substantially" may be used herein as a qualifier meaning "effectively"). In some examples, the predictive thermal model may be configured to determine the maximum current and the maximum power continuously at a predetermined frequency when the BMS is switched ON (it will be appreciated that, as used herein, electronics components or systems described as being "ON" may allow current to flow therethrough, whereas electronics components or systems described as being "OFF" may prevent current flow therethrough). In this way, the second component may be protected against degradation from overheating via correlating an indirect temperature estimation to a direct temperature measurement at the first component.

Figure 1:
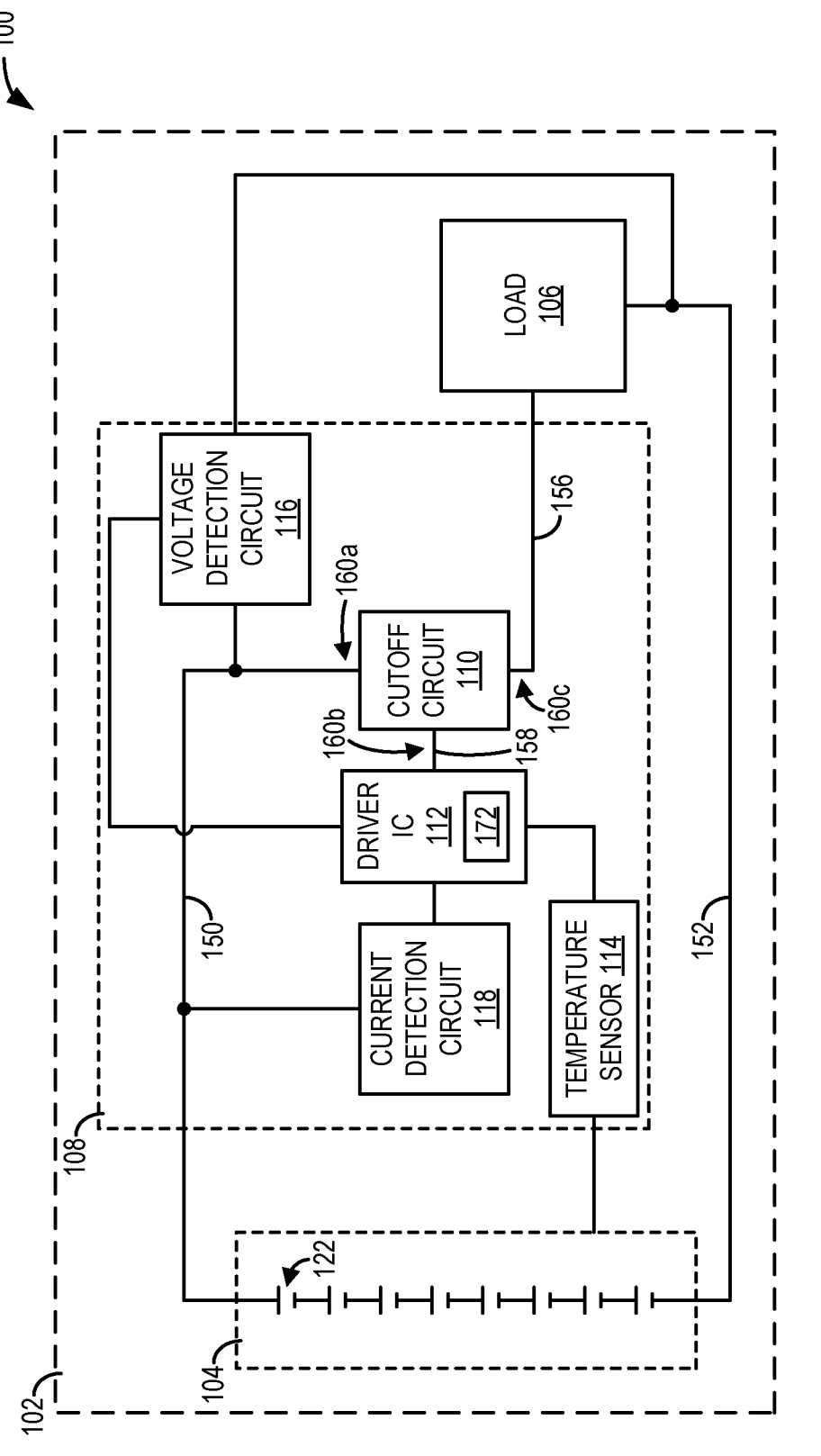
FIG. 1 shows a high-level block diagram of a battery system including a battery management system.

FIG. 1 depicts an exemplary battery system including a BMS implementing a predictive thermal model. Specifically, the BMS may be electrically coupled to a battery pack, such as the exemplary battery pack of FIGS. 2A and 2B, and may be physically provided in a printed circuit board assembly (PCBA), such as the exemplary PCBA of FIG. 3. Experimental testing and parameterization of the predictive thermal model may be furnished by a controlled environment, such as via the configuration of FIG. 9. Exemplary results of temperature prediction by the predictive thermal model as compared to measured temperatures and current are provided by the plots of FIG. 10.

Figure 4:
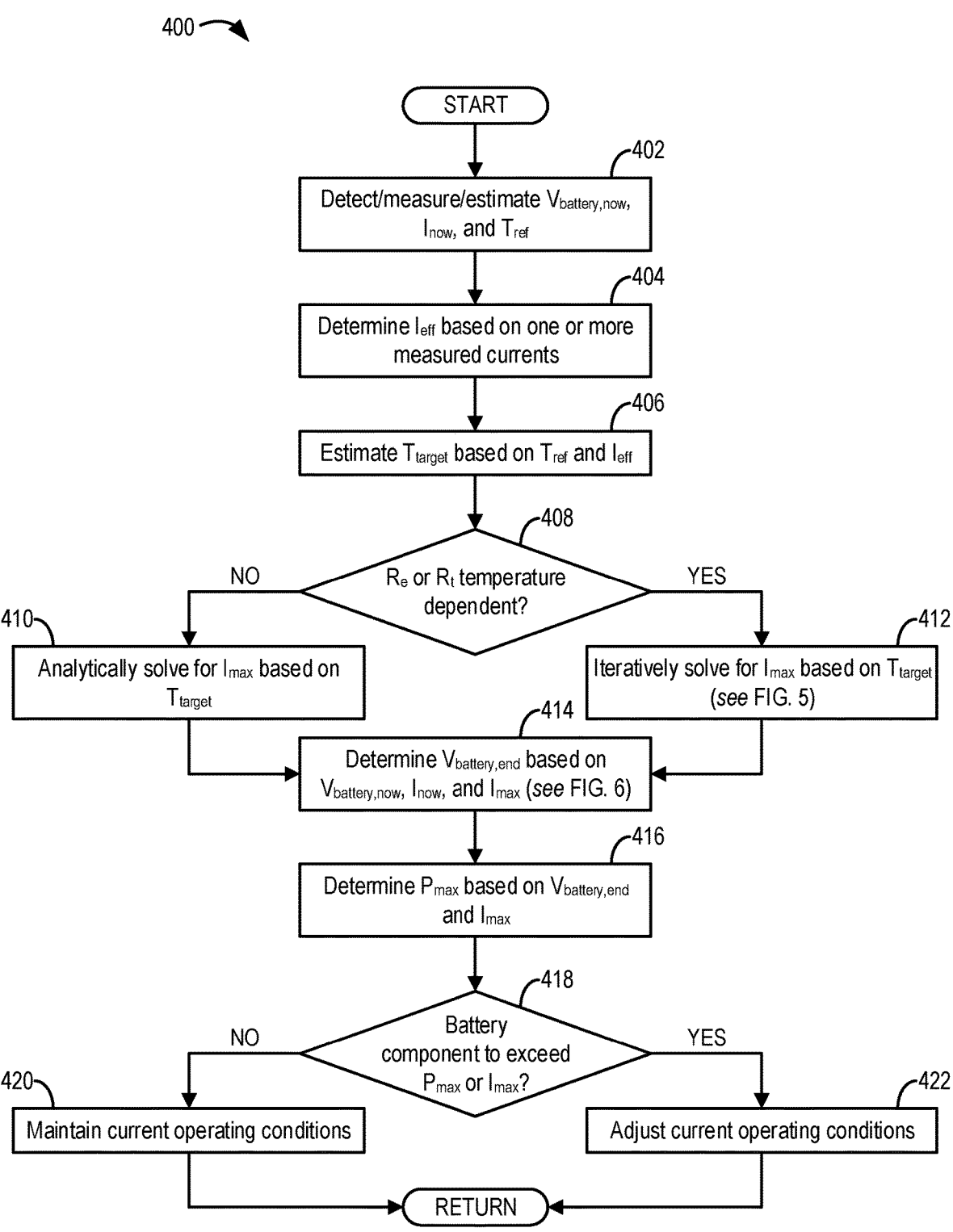
FIG. 4 shows a flow chart of a method for mitigating overheating in a battery system based on current and power capabilities determined via a predictive thermal model.

Once parameterized, the predictive thermal model may be employed to adjust one or more operating conditions of the battery system to mitigating overheating thereof by determining current and power capabilities of various battery system components, such as via the method of FIG. 4. The predictive thermal model may be structured around a solution to a first-order ODE, where the first-order ODE may be solved analytically or iteratively for a maximum current of a given battery system component over a time pulse. As one example, a method for iteratively solving for the maximum current is provided in FIG. 5. Specifically, a relative accuracy of analytic and iterative solutions of the first-order ODE may depend upon a temperature dependence of one or both of an electrical resistance and a thermal resistance of the given battery system component, as exemplified in the plots of FIGS. 7A and 7B. Once the maximum current is determined by solving the first-order ODE, a maximum power of the given battery component over the time pulse may then be determined as a product of the maximum current and a terminal voltage across a battery pack of the battery system at an end of the time pulse. One method of determining the terminal voltage is provided by FIG. 6, where an equivalent circuit model of the battery system, such as the equivalent circuit model schematically depicted in FIG. 8, may be leveraged.

Referring now to FIG. 1, a high-level block diagram 100 depicting a battery system 102 is shown. In some examples, the battery system 102 may be configured for high-power applications, such as in an electric vehicle (EV) or hybrid-electric vehicle (HEV). The battery system 102 may include a battery pack 104, the battery pack 104 including one or more lithium-ion battery cells 122. As shown, a positive supply line 150 may electrically couple a positive end of the battery pack 104 to an electrical load 106 (for example, a belt integrated starter/generator, an integrated starter/generator, etc. of an EV or HEV) via a BMS 108, and a ground return line 152 may electrically couple the electrical load 106 to a negative end of the battery pack 104. Specifically, the positive supply line 150 of the battery pack 104 may be electrically coupled to an input 160a of a cutoff circuit 110, and an output 160c of the cutoff circuit 110 may be electrically coupled to the electrical load 106 via a line 156. Further, a control input 160b of the cutoff circuit 110 may be electrically coupled to a driver integrated circuit (IC) 112 of the BMS 108 via a line 158.

The BMS 108 may be embedded within the battery system 102 and may include various software, hardware, and electronics components for monitoring the battery system 102 and protecting the battery system 102 from undue degradation. In some examples, such as in EV or HEV applications, the BMS 108 may further be configured to transmit current, estimated, and/or predicted operating conditions of the battery system 102 (such as measured, estimated, and/or predicted temperatures, voltages, currents, etc.) to an external (vehicle) controller.

Accordingly, the driver IC 112 may be communicably coupled to a controller 172, which may store machine or computer readable instructions on a non-transitory storage device or memory, the instructions executable by a logic subsystem of the controller 172 to enable the various functionalities of the BMS 108. In one example, the memory of the controller 172 may be store machine readable instructions for using a predictive thermal model to adjust one or more operating conditions of the battery system 102 to mitigate overheating of components included therein. It will be appreciated that, though the controller 172 is depicted in FIG. 1 as being included within the driver IC 112, in other examples, the controller 172 may be positioned external to the driver IC 112.

The cutoff circuit 110 may be coupled to other components in the battery system 102 via the input 160a, the control input 160b, and the output 160c. As such, a voltage at the control input 160b relative to a voltage at the output 160c may control an operating state of the cutoff circuit 110, and thereby the BMS 108 and the battery system 102. For example, if a relative voltage across the control input 160b and the output 160c is less than a threshold operating voltage, then the cutoff circuit 110 may be in an OFF state. Conversely, if the relative voltage across the control input 160b and the output 160c is greater than or equal to a threshold operating voltage, then the cutoff circuit 110 may be in an ON state. In this way, the cutoff circuit 110 may operate as a switch to selectively permit current flow from the input 160a to the output 160c depending on a voltage applied to the control input 160b.

It will be appreciated that, though a single cutoff circuit 110 is depicted at FIG. 1, the cutoff circuit 110 may be implemented as an array of cutoff circuits 110, that is, as an array of switches or transistors. For example, the cutoff circuit 110 may include one or more of FETs, such as MOSFETs or JFETs, other types of transistors, or combinations thereof. In some examples, the cutoff circuit 110 may be a single MOSFET, such as an n-channel enhancement mode MOSFET, a p-channel enhancement mode MOSFET, etc. In such examples, the input 160a may be a drain terminal, the control input 160b may be a gate terminal, and the output 160c may be a source terminal.

The controller 172 may further be configured to receive measurements from one or more sensors or detection circuits included in the BMS 108. Specifically, each of the one or more sensors or detection circuits of the BMS 108 may be communicably coupled to the driver IC 112 and the controller 172. As a first example, the one or more sensors or detection circuits of the BMS 108 may include a temperature sensor 114. In some examples, and as shown at FIG. 1, the temperature sensor 114 may be configured to measure a temperature of a physical component of the battery pack 104. However, in other examples, the temperature sensor 114 may be included on a PCBA implementing the BMS 108, and may be configured to measure a physical component of the PCBA.

As a second example, the one or more sensors or detection circuits of the BMS 108 may include a voltage detection circuit or voltmeter 116. In some examples, and as shown at FIG. 1, the voltage detection circuit 116 may be electrically coupled to each of the positive supply line 150 and the ground return line 152 to measure a potential difference across the positive and negative ends of the battery pack 104. In additional or alternative examples, the voltage detection circuit 116 may be coupled to each of the positive supply line 150, the line 156, and the line 158 to measure potential differences across the input 160a, the control input 160b, and the output 160c of the cutoff circuit 110.

As a third example, the one or more sensors or detection circuits of the BMS 108 may include a current detection circuit or ammeter 118. In some examples, and as shown at FIG. 1, the current detection circuit 118 may be electrically coupled to the positive supply line 150 to measure a current flowing from the battery pack 104. In additional or alternative examples, the current detection circuit 118 may be coupled to one or more of the ground return line 152, the line 156, or the line 158 to measure currents respectively passing therethrough.

Further, though one of each of the temperature sensor 114, the voltage detection circuit 116, and the current detection circuit 118 is shown at FIG. 1, it will be appreciated that each corresponding component may include multiple sensors or detection circuits uniquely electrically and communicably coupled in the battery system 102. In this way, a BMS for a battery system may include a controller communicably coupled to various sensors and/or detection circuits, wherein the sensors and/or detection circuits may provide inputs (for example, temperature, current, and/or voltage measurements of various battery components of the battery system) to a predictive thermal model implemented on the controller.

Figure 2A:
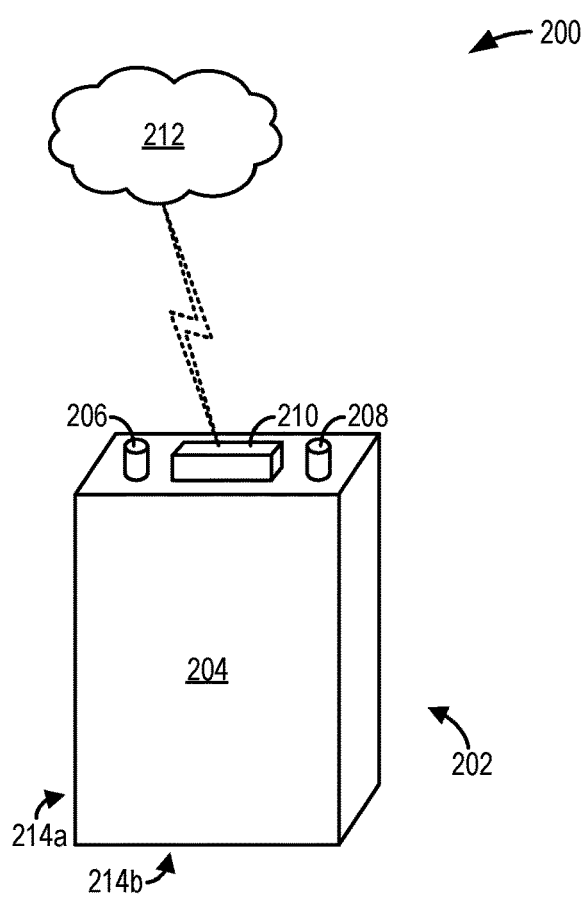
FIG. 2A shows a schematic diagram of an exemplary battery pack assembly.

Referring now to FIG. 2A, a schematic diagram 200 depicting a battery pack assembly 202 is shown. The battery pack assembly 202 may be configured for starting or powering a vehicle, such as an EV or an HEV. For example, the battery pack assembly 202 may include a 48V battery pack including a plurality of lithium-ion battery cells (as described below in detail with reference to FIG. 2B). The battery pack assembly 202 may include, or be coupled to, a BMS (not shown at FIG. 2A). Accordingly, in one example, the battery pack assembly 202 may include the battery pack 104 coupled to the BMS 108 described in detail above with reference to FIG. 1.

The plurality of lithium-ion battery cells may be arranged in a stacked configuration and removably enclosed within an external housing 204. Accordingly, the external housing 204 may be composed of a material having a low electrical conductivity, such as a plastic or other polymer, so as to prevent shorting events within the vehicle. The external housing 204, depicted in FIG. 2A as a rectangular prism, may be molded to be clearance fit into the vehicle such that the battery pack assembly 202 may be in face-sharing contact with one or more components of the vehicle, such as one or more engine components.

The external housing 204 may further be configured to include openings or cavities for interfacial components of the battery pack assembly 202. For example, the external housing 204 may be configured to expose a positive terminal post 206 and a negative terminal post 208, which may each be a lead-free terminal, for example. That is, the positive terminal post 206 and the negative terminal post 208 may be insert-molded in place on the external housing 204. Within the vehicle, the positive terminal post 206 and the negative terminal post 208 may respectively be electrically coupled to positive and negative leads such that the battery pack assembly 202 may form a closed circuit with an electrical load of the vehicle, such that power may be provided to the vehicle.

To reduce operator misuse, the positive terminal post 206 and the negative terminal post 208 may be configured with differing colors, shapes, symbols, etc. so as to indicate which of the terminal posts 206, 208 is positive and which is negative. For example, the positive terminal post 206 may be red and denoted with a plus symbol (+) and the negative terminal post 208 may be black and denoted with a negative symbol (−).

In some examples, the external housing 204 may be configured to expose a network management interface 210. In one example, the network management interface 210 may be communicatively coupled to a local interconnect network (LIN) 212 of the vehicle via a wired or wireless connection. Accordingly, in some examples, the network management interface 210 may include a physical connector for mating with a complementary connector affixed to a wire extending from a LIN bus.

In some examples, the external housing 204 may include a top cover 214a removably affixed to an enclosure base 214b. As such, the top cover 214a may be temporarily removed to replace or diagnose one or more of the plurality of lithium-ion battery cells.

Figure 2B:
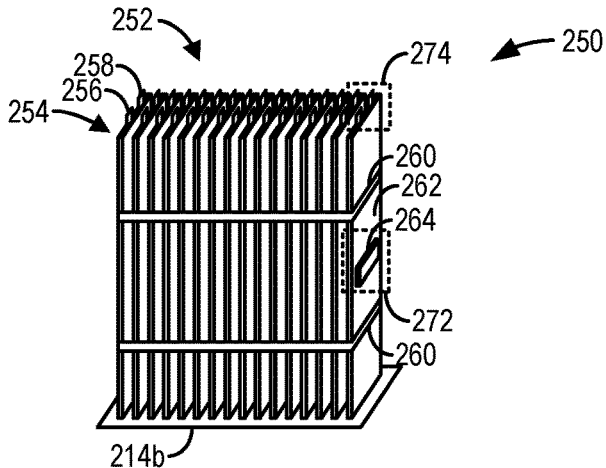
FIG. 2B shows a schematic diagram of the exemplary battery pack assemble of FIG. 2A with at least a portion of an external housing removed, exposing a plurality of stacked battery cells.

Referring now to FIG. 2B, a schematic diagram 250 depicting a battery pack 252 is shown. In some examples, the battery pack 252 may be included in the battery pack assembly 202 of FIG. 2A, wherein the top cover 214a has been removed from the battery pack assembly 202, exposing a plurality of lithium-ion battery cells 254 removably affixed to the enclosure base 214b. Accordingly, it will be appreciated that each lithium-ion battery cell 254 may represent a fundamental unit from which a battery pack of arbitrary size, arbitrary power, and having an arbitrary number of lithium-ion battery cells 254 may be constructed. It will further be appreciated that other embodiments not depicted at FIG. 2B may include a battery pack having only one lithium-ion battery cell.

In some examples, the plurality of lithium-ion battery cells 254 may be arranged in a stacked configuration, where each of the plurality of lithium-ion battery cells 254 may be a prismatic pouch electrochemical cell. As such, each of the plurality of lithium-ion battery cells 254 may include a positive electrode and a negative electrode immersed in a liquid electrolyte, where each of the positive electrode, negative electrode, and electrolyte may be enclosed by a hermetically-sealed pouch casing.

Further, each of the plurality of lithium-ion battery cells 254 may expose a positive electrode or cell tab 256 and a negative electrode or cell tab 258, which may be configured to couple to the positive electrode and the negative electrode, respectively. Accordingly, each of the plurality of lithium-ion battery cells 254 may be electrically coupled to the positive terminal post 206 and the negative terminal post 208 described in detail above with reference to FIG. 2A. In some examples, the plurality of lithium-ion battery cells 254 may be electrically coupled to one another in series and/or in parallel by one or more busbars (not shown at FIG. 2B), whereby the one or more busbars may each be electrically coupled to a plurality of electrode tabs 256, 258 on multiple lithium-ion battery cells 254. The one or more busbars may further be electrically coupled to one of the terminal posts 206, 208, such that the plurality of lithium-ion battery cells 254 may be electrically coupled to the terminal posts 206, 208 and thereby provide power to a system, for example, a vehicle.

Each lithium-ion battery cell 254 of the battery pack 252 may be identical to one another. Further, each of a total number of lithium-ion battery cells 254 and an electrical coupling configuration (e.g., parallel count and series count) of the battery pack 252 may define electrical characteristics and performance ratings thereof. As an example, the battery pack 252 may be configured in a '4S4P' configuration which has 16 lithium-ion battery cells 254 in four subgroups, where the subgroups may be electrically coupled in series, and where four lithium-ion battery cells 254 in each subgroup may be electrically coupled in parallel. In some examples, the total number of lithium-ion battery cells 254 may be odd. In other examples, the total number of lithium-ion battery cells 254 may be even.

The plurality of lithium-ion battery cells 254 may be retained in the stacked configuration by bands 260. As shown, one or more bands 260 may circumscribe the plurality of lithium-ion battery cells 254 so as to prevent displacement of individual lithium-ion battery cells 254 relative to one another.

A temperature sensor 264 may be positioned on a cell body 262 of any given lithium-ion battery cell 254. In examples wherein the given lithium-ion battery cell 254 is a lithium-ion pouch cell, the temperature sensor 264 being positioned on the cell body 262 may include affixing the temperature sensor 264 to an external surface of the hermetically-sealed pouch casing. The temperature sensor 264 may monitor a temperature of the cell body 262 of the given lithium-ion battery cell 254 and provide feedback to a controller included in a BMS (not shown at FIG. 2B) included in, or coupled to, the battery pack assembly 202. The controller may be configured to input the feedback into various executable algorithms stored in memory, such that the controller may be operable to control an operating state of the battery pack assembly 202 and thereby actively adjust the temperature in real time.

In some examples, and as shown at FIG. 2B, a single temperature sensor 264 may be positioned on the cell body 262 of a single one of the plurality of lithium-ion battery cells 254. In other examples, two or more temperature sensors 264 may be respectively included on the cell bodies 262 of two or more of the plurality of lithium-ion battery cells 254.

The temperature sensor 264 may be disposed in a physical location configured for placement of monitoring hardware. For example, and as shown at FIG. 2B, a physical location 272 may include a surface of the cell body 262 of one of the plurality of lithium-ion battery cells 254. Specifically, the cell body 262 may be substantially smooth and flat and may have a surface area large enough to accommodate the temperature sensor 264. Further, the cell body 262 may be sufficiently durable for placement of the temperature sensor 264 (that is, the cell body 262 may not be so delicate as to deform or fracture upon affixing the temperature sensor 264 thereon). Moreover, a positioning of the cell body 262 within the external housing 204 (described above in detail with reference to FIG. 2A) and relative to one another may minimize damage to the temperature sensor 264 from external forces.

However, other physical locations may not be similarly suitable for placement of the temperature sensor 264. For example, and as shown at FIG. 2B, a physical location 274 may include the electrode tabs 256, 258 of one of the plurality of lithium-ion battery cells 254. Specifically, the electrode tabs 256, 258 may have a relatively small surface area as compared to the cell bodies 262 of the plurality of lithium-ion battery cells 254 and may include delicate electrical connections thereat. As such, the physical location 274 may be substantially inaccessible for, or incompatible with, placement of the temperature sensor 264.

In addition to such practical structural considerations, cost factors may dictate that a limited number of temperature sensors are included on the battery pack 252. Accordingly, placement may be based upon prioritization of a given component. For example, it may be desirable to place the temperature sensor 264 at the physical location 272 as opposed to the physical location 274, as monitoring and controlling a temperature of the cell body 262 may be prioritized.

The physical locations 272, 274 may be physically separated from, or adjacent to, one another, such that the physical locations 272, 274 do not spatially overlap. In some examples, each of the physical locations 272, 274 may include a separate component of the battery pack assembly

202 (for example, the cell body 262 of one of the plurality of lithium-ion battery cells 254, the electrode tab 256 or 258 of one of the plurality of lithium-ion battery cells 254, etc.). In one example, the components included at the physical locations 272, 274 may be positioned adjacent to one another. In another example, the components included at the physical locations 272, 274 may be physically separated from one another, such that a space or additional component may be provided therebetween. In additional or alternative examples, the components included at the physical locations 272, 274 may be thermally coupled to one another.

Figure 3:
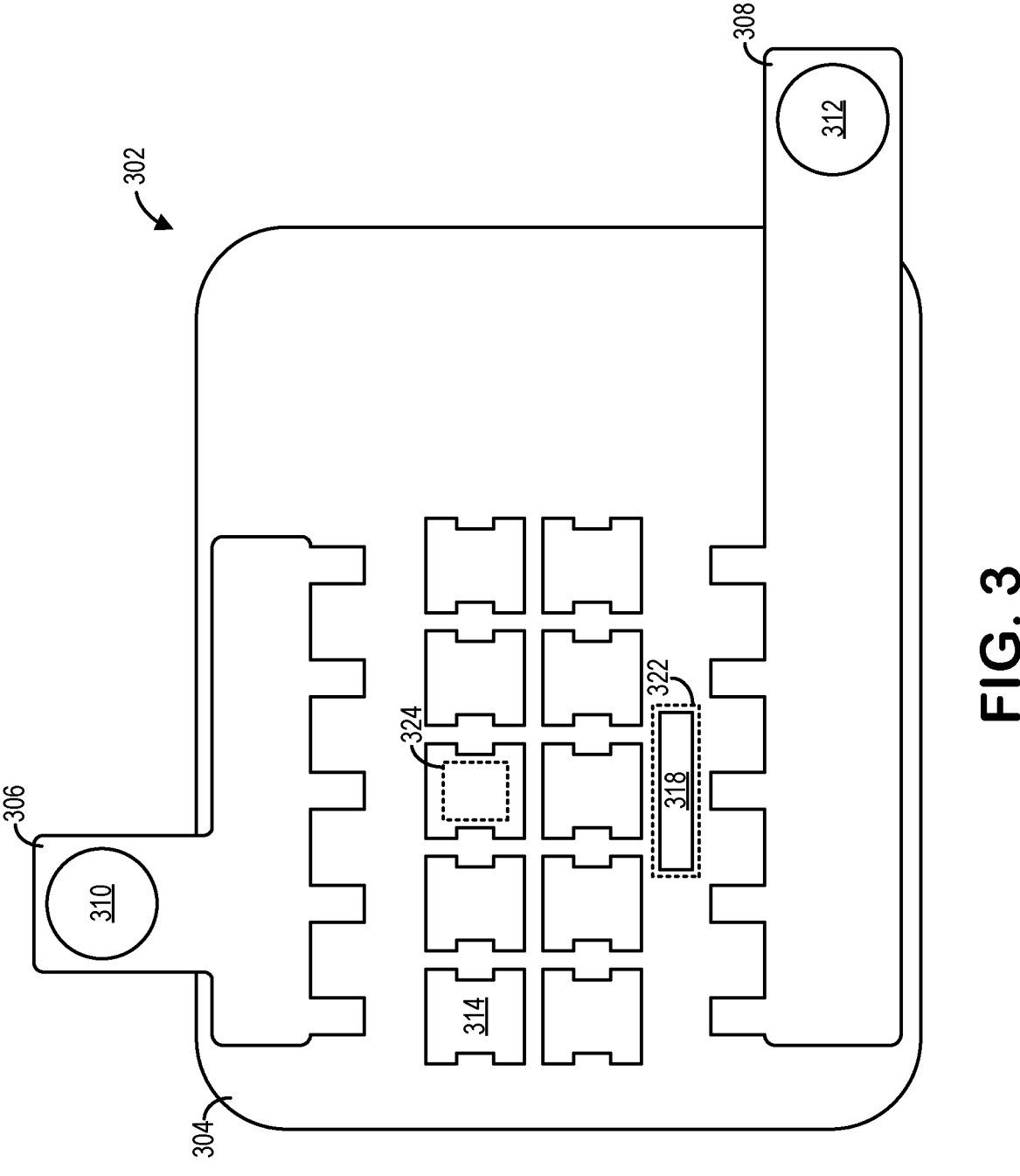
FIG. 3 shows a schematic diagram of an exemplary printed circuit board assembly (PCBA) including an array of metal-oxide-semiconductor field-effect transistors (MOS-FETs).

Referring now to FIG. 3, a schematic diagram 300 depicting a printed circuit board assembly (PCBA) 302 is shown. The PCBA 302 may include a printed circuit board (PCB) 304 having various electronics components printed, soldered, or otherwise affixed thereon. For example, the PCBA 302 may include an array of MOSFETs 314, where inputs and outputs of the MOSFETs 314 may be electrically coupled to busbars 306 and 308, respectively. In one example, the PCBA 302 may implement a BMS, such as the BMS 108 described above with reference to FIG. 1. As such, the PCBA 302 may include various circuits and electronics components operable to monitor a battery system.

As shown, the busbars 306 and 308 may respectively include couplings 310 and 312. The couplings 310 and 312 may be independently configured to electrically couple (directly or via electrical conductors) the busbars 306 and 308 to battery terminals (for example, cell tabs, terminal posts, etc.; not shown at FIG. 3) of the battery system. Each of the busbars 306 and 308 may further be electrically coupled to one or more MOSFETs 314 in the array of MOSFETs 314, such that when the one or more MOSFETs 314 are switched ON, a circuit between a given pair of battery terminals may be closed.

A temperature sensor 318 may be positioned on the PCB 304. The temperature sensor 318 may monitor a temperature of the PCB 304 and provide feedback to a controller included in the BMS (not shown at FIG. 3). The controller may be configured to input the feedback into various executable algorithms stored in memory, such that the controller may be operable to control an operating state of the battery system and thereby actively adjust the temperature in real time.

In some examples, and as shown at FIG. 3, a single temperature sensor 318 may be positioned on the PCB 304. In other examples, two or more temperature sensors 318 may be positioned on the PCB 304.

The temperature sensor 318 may be disposed in a physical location configured for placement of monitoring hardware. For example, and as shown at FIG. 3, a physical location 322 may include a surface of the PCB 304. Specifically, the PCB 304 may be substantially smooth and flat and may have a surface area large enough to accommodate the temperature sensor 318. Further, the PCB 304 may be sufficiently durable for placement of the temperature sensor 318 (that is, the PCB 304 may not be so delicate as to deform or fracture upon affixing the temperature sensor 318 to a surface thereof).

However, other physical locations may not be similarly suitable for placement of the temperature sensor 318. For example, and as shown at FIG. 3, a physical location 324 may include a surface of one MOSFET 314 in the array of MOSFETs 314. Specifically, the MOSFET 314 may have a relatively small surface area as compared to the PCB 304. As such, the physical location 324 may be substantially inaccessible for, or incompatible with, placement of the temperature sensor 318.

In addition to such practical structural considerations, cost factors may dictate that a limited number of temperature sensors are included on the PCBA 302. Accordingly, placement may be based upon prioritization of a given component. For example, it may be desirable to place the temperature sensor 218 at the physical location 322 as opposed to the physical location 324, as monitoring and controlling a temperature of the surface of the PCB 304 may be prioritized.

The physical locations 322, 324 may be physically separated from, or adjacent to, one another, such that the physical locations 322, 324 do not spatially overlap. In some examples, each of the physical locations 322, 324 may include a separate component of the PCBA 302 (for example, the PCB 304, one MOSFET 314 in the array of MOSFETs 314, etc.). In one example, the components included at the physical locations 322, 324 may be positioned adjacent to one another. In another example, the components included at the physical locations 322, 324 may be physically separated from one another, such that a space or additional component may be provided therebetween. In additional or alternative examples, the components included at the physical locations 322, 324 may be thermally coupled to one another.

Referring now to FIG. 4, a flow chart depicting a method 400 for employing a predictive thermal model to estimate current and power capabilities in a battery system and adjust operating conditions therefrom is shown. Specifically, a measured, reference temperature of a first (monitored) component of the battery system may be used to estimate an unmeasured, target temperature of a second (unmonitored) component of the battery system. The target temperature may be input into a first-order ODE which may be subsequently solved for a maximum current of the second component over a predetermined duration. The maximum current may further be used to determine a maximum power of the second component over the predetermined duration. Based on whether an actual current or an actual power of the second component is requested which exceeds the maximum current or the maximum power, respectively, one or more operating conditions of the battery system may be adjusted to respectively maintain the actual current or the actual power below the maximum current or the maximum power. In this way, overheating in an unmonitored component of a battery system may be mitigated by using a predicted temperature of the unmonitored component to tie thermal limits of the unmonitored component to current and power limits of the unmonitored component, thereby enabling adjustment of operating conditions of the battery system to control an actual current and power at the unmonitored component and thereby reduce an actual temperature thereat.

Method 400 is described below in relation to the systems and components depicted in FIGS. 1-3. For instance, in some examples, method 400 may be implemented in the BMS 108 to monitor the battery system of FIG. 1. In such examples, at least some steps of method 400 may be implemented as executable instructions in the BMS 108. In one example, method 400 may be implemented in non-transitory memory and executed by a logic subsystem of a computing device, such as the controller 172 of FIG. 1. It will be appreciated that method 400 may be implemented with other systems and components without departing from the scope of the present disclosure. It will further be appreciated that individual steps discussed with reference to method 400 may be added, removed, substituted, or interchanged within the scope of the present disclosure.

At 402, method 400 may include detecting, measuring, and/or estimating one or more battery system operating conditions. In some examples, the one or more battery system operating conditions may include one or more temperatures, currents, and voltages of the battery system. In some examples, the one or more battery system operating conditions may be measured by one or more sensors or detection circuits communicably coupled to the controller or may be inferred based on available data. Accordingly, the controller may be configured to receive the one or more battery system operating conditions from the one or more sensors or detection circuits.

As one example, a reference temperature $T_{ref}$ of a first component of the battery system may be measured by a temperature sensor (for example, the temperature sensor 114) thermally coupled to the first component. As a first non-limiting example, the first component may be included in a battery pack, such as the battery pack 104. For instance, the first component may be a cell body of a lithium-ion battery cell included in the battery pack, such as the cell body 262 of a given lithium-ion battery cell 254. As a second non-limiting example, the first component may be included in a PCBA, such as the PCBA 302. For instance, the first component may be a PCB included in the PCBA, such as the PCB 304.

As an additional or alternative example, a voltage or potential difference $V_{battery,now}$ across the battery pack may be measured by a voltage detection circuit (for example, the voltage detection circuit 116) electrically coupled to each of a positive supply line and a ground return line of the battery pack. For instance, the battery pack may be the battery pack 104, such that the positive supply line may be the positive supply line 150 and the ground return line may be the ground return line 152.

As an additional or alternative example, a current $I_{now}$ at a second component of the battery system may be measured by a current detection circuit (for example, the current detection circuit 118) electrically coupled to the second component. As a first non-limiting example, the second component may be included with the first component in the battery pack, such as the battery pack 104. For instance, the second component may be a cell tab of a lithium-ion battery cell included in the battery pack, such as the cell tab 258 or 260 of the given lithium-ion battery cell 254. As a second non-limiting example, the second component may be included with the first component in the PCBA, such as the PCBA 302. For instance, the second component may be a MOSFET included in the PCBA, such as one MOSFET 314 in the array of MOSFETs 314.

In some examples, the current detection circuit may be directly electrically coupled to the second component. In other examples, the current detection circuit may be electrically coupled to the second component via one or more intermediary components. For example, the current detection circuit may be electrically coupled to the positive supply line (for example, the positive supply line 150) of the battery pack and may measure a battery current flowing from the battery pack, from which the current $I_{now}$ at the second component may be inferred.

In some examples, the first component may be easily accessible for placement of the temperature sensor, whereas the second component may be substantially inaccessible for, or incompatible with, placement of the temperature sensor. Accordingly, the first component may be an external battery component and the second battery component may be either an internal battery component or an external battery component. As used herein when referring to battery components, "external" may refer to a surface or other area of a battery component accessible to an operator or manufacturer without dismantling a battery including the battery component and "internal" may refer to a surface or other area of a battery component inaccessible to an operator or manufacturer without dismantling a battery including the battery component (as an example, an outer surface of a pouch casing may be considered an external battery component and a current collector having a slurry-based coating thereon may be considered an internal battery component).

In some examples, the first component may be different from the second component. However, in other examples, the first component may represent a first area or surface on a battery component accessible for placement of the temperature sensor and the second component may represent a second area or surface on the battery component substantially inaccessible for, or incompatible with, placement of the temperature sensor. In one example, the first component may be positioned adjacent to the second component. In another example, the first component may be physically separated from the second component, such that a space or additional component may be provided therebetween.

In some examples, the first component may be thermally coupled to the second component. Specifically, when relatively close thermal coupling may be assumed between the first and second battery components, a relatively simple and generalized algebraic relationship may be used to estimate a target temperature $T_{target}$ of the second component based on each of the reference temperature $T_{ref}$ of the first component and an effective current $I_{eff}$ of the second component.

As one example, the algebraic relationship may correspond to equation (3):

$$T_{target,k} = T_{ref,k} + \alpha I_{eff,k}^2 \qquad (3)$$

where $\alpha$ is a calibratable gain factor and k indexes a kth time step at which $T_{ref}$ may be measured and at which $I_{eff}$ and $T_{target}$ may be determined, where the kth time step may be a current time. It will be appreciated that, as used herein, any given time-dependent variable may be assumed to be measured at the kth time step unless otherwise specified. As non-limiting examples, $T_{target}$ may be $T_{target,k}$, $I_{eff}$ may be $I_{eff,k}$, $T_{ref}$ may be $T_{ref,k}$, $I_{now}$ may be $I_k$, and $V_{battery,now}$ may be $V_{battery,k}$, and equation (1) may be equivalent to equation (3). As discussed below at 404 and 406, equation (3) may be well-suited for real-time performance on the controller of the BMS, as the controller may have relatively low computational capabilities and equation (3) may be relatively computationally inexpensive (for instance, equation (3) may include relatively few coefficients subject to calibration).

At 404, method 400 may include determining the effective current $I_{eff}$ at the second component based on a measured current at the second component, where the measured current may include $I_{now}$ and/or one or more currents measured at separate time steps prior to the kth time step. As a first example, the effective current $I_{eff}$ may be a weighted moving average of currents measured at N previous time steps. Specifically, the effective current $I_{eff}$ may be determined as follows:

$$I_{eff,k} = \frac{w_1 I_{k-1} + w_2 I_{k-2} + w_3 I_{k-3} + w_4 I_{k-4} + \ldots + w_N I_{k-N}}{N} \qquad (4)$$

where $w_1, \ldots, w_N$ are calibratable weighting factors respectively corresponding to currents $I_{k-1}, \ldots, I_{k-N}$ respectively measured at the (k−1)th, ..., (k−N)th time steps. In some examples, the effective current $I_{eff}$ may thus be considered a "future" current delay determined from N "instantaneously" measured currents, as the effective current $I_{eff}$ may correspond to a time step following time steps at which currents were actively measured. It will be appreciated that equation (4) may be generalized to any value of N to provide greater or fewer calibratable parameters to optimize, where N may be selected to balance a desired accuracy of the effective current $I_{eff}$ with available computational resources.

As a second example, the effective current $I_{eff}$ may be a filtered current determined via a low-pass filter. Specifically, the effective current $I_{eff}$ may be determined as follows:

$$I_{eff,k} = f I_k + (1-f) I_{eff,k-1} \qquad (5)$$

where f is a calibratable filter constant for the low-pass filter and $I_{eff,k-1}$ is an effective current obtained at a previous ((k−1)th) time step.

At 406, method 400 may include estimating or predicting the target temperature $T_{target}$ of the second component based on the reference temperature $T_{ref}$ of the first component and the effective current $I_{eff}$ of the second component. In one example, the target temperature $T_{target}$ may be determined based on equation (3) (as described in detail above). In this way, an unmeasured (virtual) temperature of an unmonitored component of a battery system may be correlated to a measured (instantaneous) temperature of a monitored component of the battery system, such that no additional hardware, such as a temperature sensor, may be included at the unmonitored component. Further, relatively few calibratable parameters ($\alpha$, f, $w_1, \ldots, w_N$) may be employed in determining the target temperature $T_{target}$, such that relatively little testing data may be used in obtaining a sufficiently accurate value of the target temperature $T_{target}$.

The target temperature $T_{target}$ may be employed to determine a maximum current $I_{max}$ manageable by the second component over a predetermined duration or time pulse $t_p$ following the kth time step without overheating the second component (that is, maintaining the target temperature $T_{target}$ below a maximum temperature $T_{target,lim}$ above which the second component may degrade faster than a threshold degradation rate). In some examples, $t_p$ may be greater than or equal to 1 s and less than or equal to 10 s. For example, $t_p$ may be 1 s, 2 s, or 10 s.

In one example, a temperature evolution of the second component may be modeled via the following first-order ODE:

$$C_m \frac{dT_{target}}{dt} = I_{max}^2 R_e + \frac{T_{amb} - T_{target}}{R_t} \qquad (2)$$

where $C_m$ is a thermal capacity of the second component, t is time, $T_{amb}$ is a temperature of an ambient environment of the battery system, $R_e$ is an electrical resistance of the mth component, and $R_t$ is a thermal resistance between the mth component and the ambient environment. Equation (2) may be solved by imposing two boundary conditions: (i) at t=0, $T_{target}=T_{target,k}$; and (ii) at t=$t_p$, $T_{target}=T_{target,lim}$.

At 408, method 400 may include determining whether $R_e$ or $R_t$ are substantially temperature dependent. In principal, $R_e$ and $R_t$ may be temperature dependent for any battery component. However, such temperature dependence may be minimal and may be assumed constant over the time pulse $t_p$ for computational purposes. That is, in examples wherein $I_{max}$ may be solved for to a desired degree of accuracy by using constant $R_e$ and $R_t$, an assumption of substantially temperature-independent $R_e$ and $R_t$ may be utilized. For instance, in examples wherein the second component is a cell tab composed of Al or Cu, constant $R_e$ and $R_t$ with respect to temperature may be assumed. However, in other examples, and as discussed below with reference to FIGS. 7A and 7B, $R_e$ and $R_t$ may be substantially temperature dependent and the assumption of constant $R_e$ and $R_t$ with respect to temperature may not be made. For instance, in examples wherein the second component is a MOSFET, the assumption of constant $R_e$ with respect to temperature may not be made. Further, the assumption of constant $R_t$ with respect to temperature may not be made when thermal radiation effects are considered.

Figure 6:
FIG. 6 shows a flow chart of a method for determining a terminal voltage of a battery pack in a battery system following a time pulse.
Figure 6:
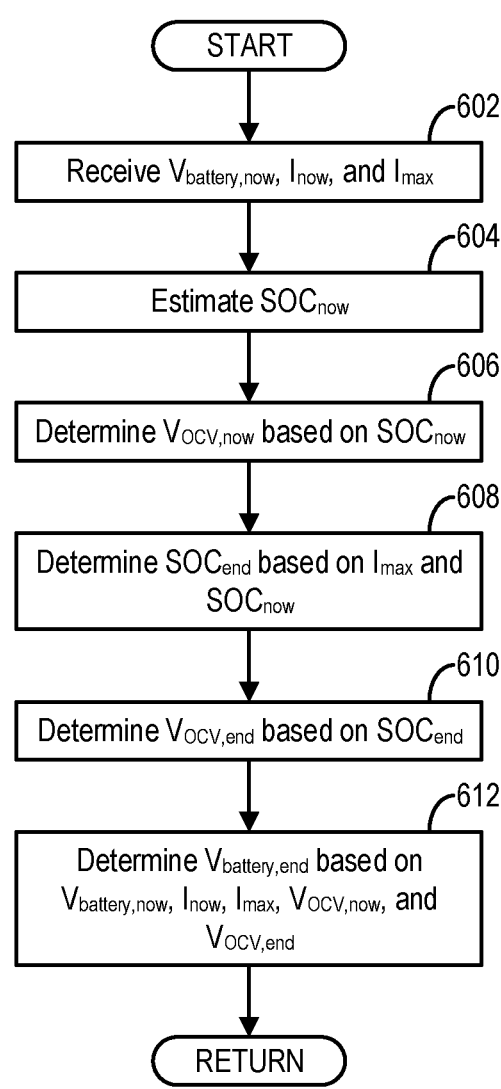
Figures 7A, 7B:
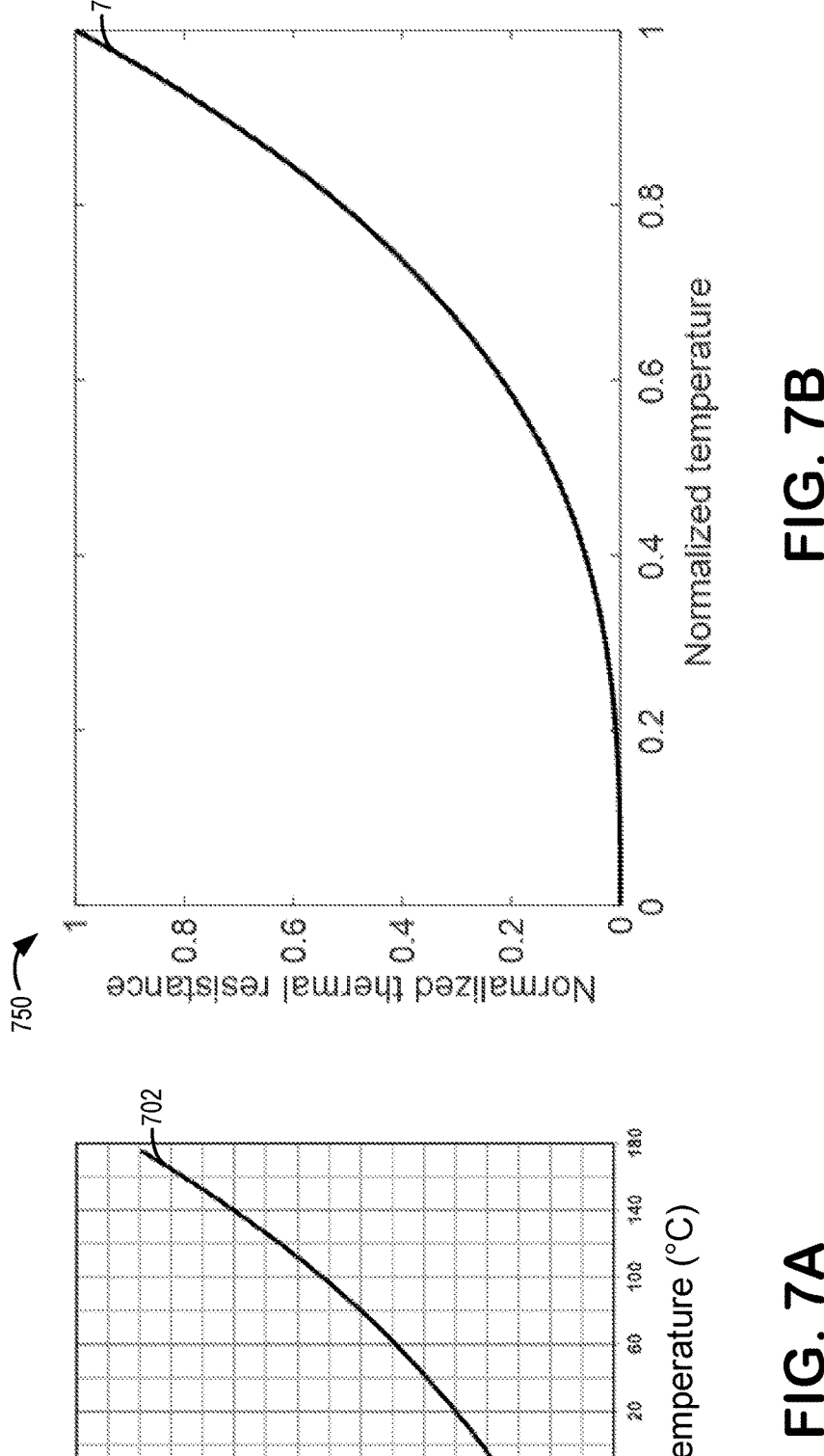
FIG. 7A shows a plot of a temperature dependence of an electrical resistance of an exemplary battery component.
FIG. 7B shows a plot of a temperature dependence of a thermal resistance of an exemplary battery component.

Referring now to FIG. 7A, plot 700 illustrating a temperature dependence of an electrical resistance of an exemplary component of a battery system is shown. In one example, the component may be a MOSFET included in a PCBA of the battery system. As shown, the electrical resistance (in mΩ) is represented by an ordinate and a temperature (in ° C.) is represented by an abscissa, where the temperature dependence may be depicted in the plot 700 by a curve 702. Though the temperature dependence is depicted by the curve 702 as having being a positive, non-linear dependence, in other examples, the temperature dependence may be a negative dependence or a linear dependence. In examples wherein the curve 702 has a non-linear dependence, the non-linear dependence may be a logarithmic dependence, an exponential dependence, a polynomial dependence, etc. In some examples, data depicted by the plot 700 may be stored on a controller of a BMS, such as the controller 172 of the BMS 108 of FIG. 1, and may be employed by a predictive thermal model stored in memory, such as the via the methods described herein with reference to FIGS. 4-6.

Referring now to FIG. 7B, plot 750 illustrating a temperature dependence of a thermal resistance of an exemplary component of a battery system is shown. In one example, the component may be a MOSFET included in a PCBA of the battery system. As shown, the thermal resistance (in normalized units) is represented by an ordinate and a temperature (in normalized units) is represented by an abscissa, where the temperature dependence may be depicted in the plot 750 by a curve 752. Though the temperature dependence is depicted by the curve 752 as having being a positive, non-linear dependence, in other examples, the temperature dependence may be a negative dependence or a linear dependence. In examples wherein the curve 752 has a non-linear dependence, the non-linear dependence may be a logarithmic dependence, an exponential dependence, a polynomial dependence, etc. In some examples, data depicted by the plot 750 may be stored on a controller of a BMS, such as the controller 172 of the BMS 108 of FIG. 1, and may be employed by a predictive thermal model stored in memory, such as the via the methods described herein with reference to FIGS. 4-6.

Referring again to FIG. 4, if each of $R_e$ and $R_t$ are determined to be substantially independent of temperature over the time pulse $t_p$, method 400 may proceed to 410, where method 400 may include analytically solving equation (2) for the maximum current $I_{max}$ based on the target temperature $T_{target}$, the maximum temperature $T_{target,lim}$, and constant $R_e$ and $R_t$. Specifically, an analytical solution of equation (2) under the above described assumptions may be given as:

$$I_{max} = \sqrt{\frac{(T_{target,lim} - T_{amb}) - (T_{target,k} - T_{amb})\exp\left(-\frac{tp}{\tau}\right)}{R_e R_t \left[1 - \exp\left(-\frac{tp}{\tau}\right)\right]}} \qquad (6)$$

where $\tau = R_t C_m$. In some examples, the analytical solution to equation (2) may be desirable, as the analytical solution may utilize less computational resources than a numerical solution to equation (2).

If one or both of $R_e$ and $R_t$ are determined to be substantially temperature dependent over the time pulse $t_p$, method 400 may proceed to 412, where method 400 may include iteratively solving equation (2) for the maximum current $I_{max}$ based on on the target temperature $T_{target}$, the maximum temperature $T_{target,lim}$, and variable $R_e$ and $R_t$. Specifically, and as described below with reference to FIG. 5, the numerical solution of equation (2) may be obtained within a convergence criterion by iteratively solving the following:

$$I_{max,n} = \sqrt{\frac{(T_{target,lim} - T_{amb}) - (T_{target,k} - T_{amb})\exp\left(-\frac{tp}{\tau_{n-1}}\right)}{R_{e,n-1} R_{t,n-1} \left[1 - \exp\left(-\frac{tp}{\tau_{n-1}}\right)\right]}} \qquad (7)$$

where $\tau_{n-1} = R_{t,n-1} C_m$ and n and n−1 respectively index an nth and an (n−1)th iteration. Specifically, $R_{e,n-1}$ and $R_{t,n-1}$ may be the electrical and thermal resistance, respectively, of the (n−1)th iteration as a function of a time-averaged target temperature $T_{avg,target,n-1}$ over the time pulse $t_p$ for the (n−1)th iteration.

Figure 5:
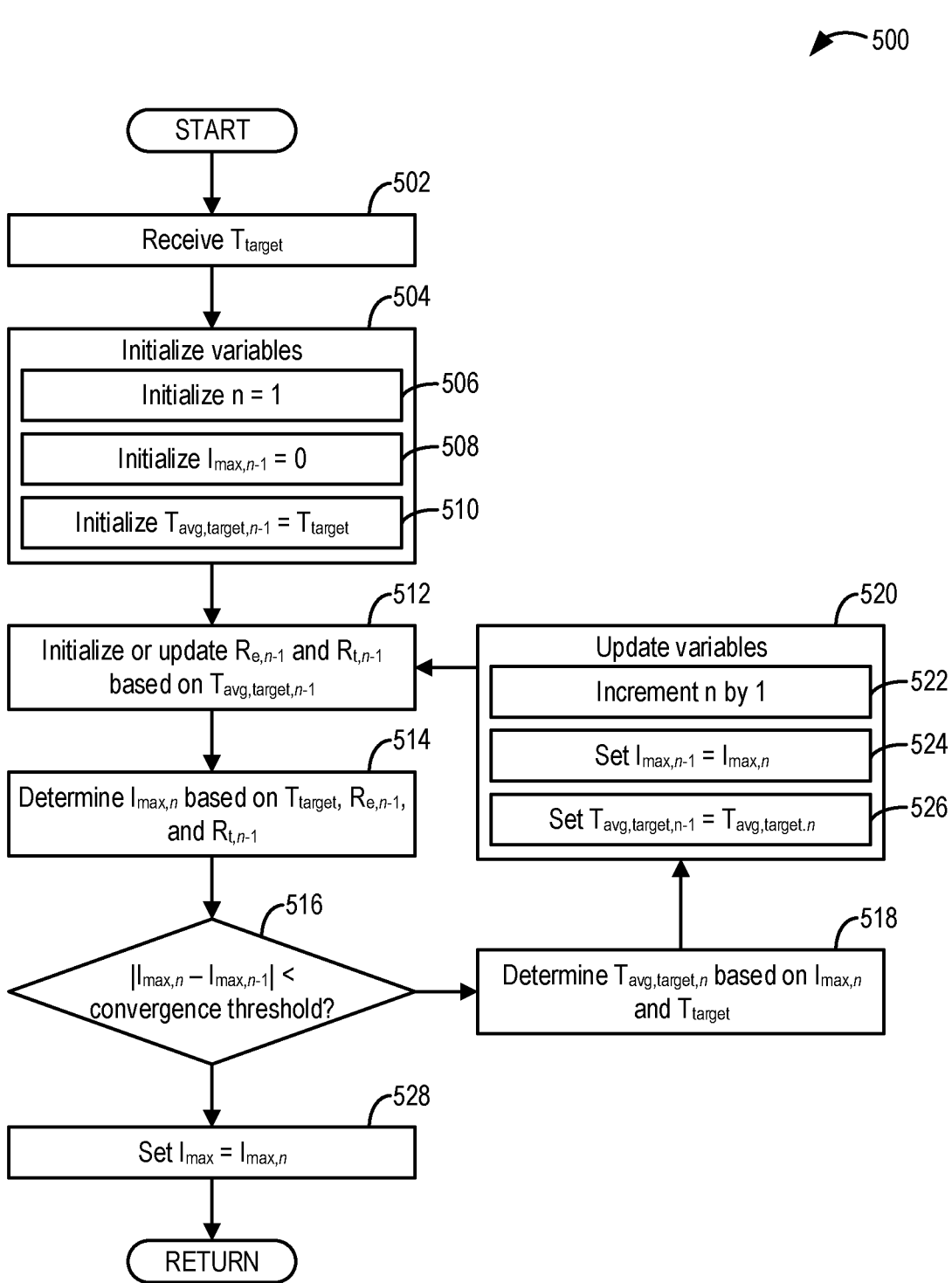
FIG. 5 shows a flow chart of a method for iteratively solving a first-order ordinary differential equation for a maximum current manageable by a battery component in a battery system.

Referring now to FIG. 5, a flow chart depicting a method 500 for iteratively solving a first-order ODE for a maximum current $I_{max}$ manageable by a component in a battery system over a time pulse $t_p$ is shown. In one example, method 500 may provide a numerical solution to equation (2) within a convergence criterion by iteratively solving equation (7). Accordingly, method 500 may be performed as part of method 400 of FIG. 4, such as at 412. As such, similarly labeled variables and coefficients described above with reference to method 400 may be employed in method 500.

Method 500 is further described below in relation to the systems and components depicted in FIGS. 1-3. For instance, in some examples, method 500 may be implemented in the BMS 108 to monitor the battery system 102 of FIG. 1. In such examples, at least some steps of method 500 may be implemented as executable instructions in the BMS 108. In one example, method 500 may be implemented in non-transitory memory and executed by a logic subsystem of a computing device, such as the controller 172 of FIG. 1. It will be appreciated that method 500 may be implemented with other systems and components without departing from the scope of the present disclosure. It will further be appreciated that individual steps discussed with reference to method 500 may be added, removed, substituted, or interchanged within the scope of the present disclosure.

At 502, method 500 may include receiving a target temperature $T_{target}$ of the component of the battery system at a kth time step (accordingly, $T_{target}$ may also be represented below as $T_{target,k}$). In one example, the target temperature $T_{target}$ may be estimated via equation (3) as part of method 400, such as at 406. As such, the component of the battery system may be the second component described in detail above with reference to FIG. 4.

At 504, method 500 may include initializing variables for both iteratively solving equation (7) and determining each of an electrical resistance $R_{e,n-1}$ and a thermal resistance $R_{t,n-1}$ at an (n−1)th iteration therefor. Specifically, at 506, method 500 may include initializing n=1, that is, indexing a first iteration. At 508, method 500 may include initializing $I_{max,n-1}$=0, that is, initializing a maximum current at the (n−1)th iteration (a zeroth iteration when n=1) to be zero.

Each of the electrical resistance $R_{e,n-1}$ and the thermal resistance $R_{t,n-1}$ may be dependent on a time-averaged target temperature $T_{avg,target,n-1}$ over the time pulse $t_p$ for the (n−1)th iteration. Accordingly, at 510, method 500 may include initializing $T_{avg,target,n-1}=T_{target}$, that is, initializing the time-averaged target temperature at the (n−1)th iteration (the zeroth iteration when n=1) to be the target temperature $T_{target}$ received at 502.

At 512, method 500 may include initializing (when n=1) or updating (when n>1) each of the electrical resistance $R_{e,n-1}$ and the thermal resistance $R_{t,n-1}$ based on the time-averaged target temperature $T_{avg,target,n-1}$. Specifically, each of the electrical resistance $R_{e,n-1}$ and the thermal resistance $R_{t,n-1}$ may be determined by inputting the time-averaged target temperature $T_{avg,target,n-1}$ into a predefined transfer function (for example, the plots of FIGS. 7A and 7B) or a lookup table. Accordingly, at 514, method 500 may include determining a maximum current $I_{max,n}$ at the nth iteration by substituting the target temperature $T_{target}$ and each of the electrical resistance $R_{e,n-1}$ and the thermal resistance $R_{t,n-1}$ into equation (7).

At 516, method 500 may include determining whether an absolute difference between the maximum current $I_{max,n}$ and the maximum current $I_{max,n-1}$ is less than a convergence threshold. The convergence threshold may be adjusted by an operator or a manufacturer of the battery system to an arbitrary level of precision. For example, the convergence threshold may be selected to balance a desired accuracy of the maximum current $I_{max}$ with available computational resources. It will be appreciated that, though a difference-based convergence threshold is employed at 516, additional or alternative convergence criteria (for example, a total number of iterations, a root-mean-square deviation, etc.) may be employed within the scope of the present disclosure.

If the absolute difference between the maximum current $I_{max,n}$ and the maximum current $I_{max,n-1}$ is greater than or equal to a convergence threshold, method 500 may proceed to 518, where method 500 may include determining the time-averaged target temperature $T_{avg,target,n}$ at the nth iteration based on the maximum current $I_{max,n}$ and the target temperature $T_{target}$. In one example, the time-averaged target temperature $T_{avg,target,n}$ may be given as $$T_{avg,target,n} = \frac{\int_{t_k}^{t_k+t_p} T_{target,n}(t)dt}{t_p} \tag{8}$$

where $t_k$ is a time at the kth time step (that is, a beginning of the time pulse $t_p$) and $T_{target,n}(t)$ is a target temperature profile of the time pulse $t_p$ for the nth iteration, which may be given as:

$$T_{target,n}(t) = \tag{9}$$

$$T_{amb} + (T_{target,k} - T_{amb})\exp\left(-\frac{t}{\tau_{n-1}}\right) + R_{e,n-1}R_{t,n-1}I_{max,n}^2\left[I - \exp\left(-\frac{t}{\tau_{n-1}}\right)\right]$$

where $T_{amb}$ is a temperature of an ambient environment of the battery system and $\tau_{n-1}=R_{t,n-1}C_m$, where $C_m$ is a thermal capacity of the component. By substituting equation (9) for the target temperature profile $T_{target,n}(t)$ in equation (8), the time-averaged target temperature $T_{avg,target,n}$ may be given as:

$$T_{avg,target,n} = T_{amb} + R_{e,n-1}R_{t,n-1}I_{max,n}^2 + \tag{10}$$

$$\frac{(T_{amb} + R_{e,n-1}R_{t,n-1}I_{max,n}^2 - T_{target,k})]\left[1 + \exp\left(-\frac{t_p}{\tau_{n-1}}\right)\right]}{\frac{t_p}{\tau_{n-1}}}$$

At 520, method 500 may include updating the variables for a next iteration. Specifically, at 522, method 500 may include incrementing n by 1. At 524, method 500 may include setting $I_{max,n-1}=I_{max,n}$, that is, updating the maximum current $I_{max}$ based on a most recent iteration. At 526, method 500 may include setting the time-averaged target temperature $T_{avg,target,n-1}=T_{avg,target,n}$, that is, updating the time-averaged target temperature based on the most recent iteration. Further, method 500 may return to 512 to update each of the electrical resistance $R_{e,n-1}$ and the thermal resistance $R_{t,n-1}$ based on the updated time-averaged target temperature $T_{avg,target,n-1}$.

If the absolute difference between the maximum current $I_{max,n}$ and the maximum current $I_{max,n-1}$ is less than a convergence threshold, method 500 may proceed to 528, where method 500 may include setting $I_{max}=I_{max,n}$, that is, setting the maximum current $I_{max}$ to a converged value. In this way, a maximum current manageable by a battery component of a battery system over a time pulse may be determined via an iteratively obtained numerical solution to a first-order ODE.

Referring again to FIG. 4, at 414, method 400 may include determining a terminal voltage $V_{battery,end}$ across the battery pack at the end of the time pulse $t_p$ based on the voltage $V_{battery,now}$, the current $I_{now}$, and the maximum current $I_{max}$, where the maximum current $I_{max}$ may either be determined by analytically solving equation (2) at 410 or iteratively solving equation (2) at 412. In some examples, and as described below with reference to FIGS. 6 and 8, the terminal voltage $V_{battery,end}$ may be determined by inputting the voltage $V_{battery,now}$, the current $I_{now}$, and the maximum current $I_{max}$ into an equivalent circuit model. In some examples, the equivalent circuit model may be a resistance-capacitor (RC) equivalent circuit model.

Referring now to FIG. 6, a flow chart depicting a method 600 for determining a terminal voltage $V_{battery,end}$ across a battery pack of a battery system following a time pulse $t_p$ is shown. Accordingly, method 600 may be performed as part of method 400 of FIG. 4, such as at 414. As such, similarly labeled variables and coefficients described above with reference to method 400 may be employed in method 600.

Method 600 is further described below in relation to the systems and components depicted in FIGS. 1-3. For instance, in some examples, method 600 may be implemented in the BMS 108 to monitor the battery system 102 of FIG. 1. In such examples, at least some steps of method 600 may be implemented as executable instructions in the BMS 108. In one example, method 600 may be implemented in non-transitory memory and executed by a logic subsystem of a computing device, such as the controller 172 of FIG. 1. It will be appreciated that method 600 may be implemented with other systems and components without departing from the scope of the present disclosure. It will further be appreciated that individual steps discussed with reference to method 600 may be added, removed, substituted, or interchanged within the scope of the present disclosure.

At 602, method 600 may include receiving a voltage $V_{battery,now}$ across the battery pack at a beginning of the time pulse $t_p$, a current $I_{now}$ at the component at the beginning of the time pulse $t_p$, and a maximum current $I_{max}$ manageable by the component over the time pulse $t_p$. In one example, one or more of the voltage $V_{battery,now}$, the current $I_{now}$, and the maximum current $I_{max}$ may be determined as part of method 400, such as at one or more of 402, 410, and 412. As such, the component of the battery system may be the second component described in detail above with reference to FIG. 4.

At 604, method 600 may include estimating a state of charge $SOC_{now}$ at the beginning of the time pulse $t_p$. In one example, the state of charge $SOC_{now}$ may be estimated via a state of charge estimation algorithm implemented on the BMS. For instance, the state of charge $SOC_{now}$ may be estimated via the Coulomb counting method, in which a measured current (for example, $I_{now}$) may be integrated over time (for example, $t_p$) to determine an amount of charge (battery capacity) transferred into and out of the battery pack. Accordingly, the state of charge $SOC_{now}$ may be determined as a ratio of a currently remaining battery capacity of the battery pack to a maximum available battery capacity of the battery pack.

At 606, method 600 may include determining an open-circuit voltage $V_{OCV,now}(SOC_{now})$ of the battery system at the beginning of the time pulse $t_p$ based on the state of charge $SOC_{now}$. Specifically, the open-circuit voltage $V_{OCV,now}$ $(SOC_{now})$ may be a function of the state of charge $SOC_{now}$, such that the open-circuit voltage $V_{OCV,now}(SOC_{now})$ may be determined based on an open-circuit voltage/state of charge (OCV-SOC) curve. In some examples, the OCV-SOC curve may be obtained via numerically fitted experimental test data in the form of a function or lookup table. In one example, the OCV-SOC curve may be obtained via a cell open-circuit voltage characterization test, such as the galvanostatic intermittent titration technique.

At 608, method 600 may include determining a state of charge $SOC_{end}$ at the end of the time pulse $t_p$ based on the maximum current $I_{max}$ and the state of charge $SOC_{now}$. In some examples, the state of charge $SOC_{end}$ may be estimated via the Coulomb counting method (as described above). In such examples, the state of charge $SOC_{end}$ may be given as:

$$SOC_{end} = SOC_{now} + \frac{I_{max}t_p}{36 * Cap} \qquad (11)$$

where Cap is a capacity of the battery pack.

At 610, method 600 may include determining an open-circuit voltage $V_{OCV,end}(SOC_{end})$ of the battery system at the end of the time pulse $t_p$ based on the state of charge $SOC_{end}$. Specifically, the open-circuit voltage $V_{OCV,end}(SOC_{end})$ may be a function of the state of charge $SOC_{end}$, such that the open-circuit voltage $V_{OCV,end}(SOC_{end})$ may be determined based on the OCV-SOC curve described above at 606.

At 612, method 600 may include determining the terminal voltage $V_{battery,end}$ across the battery pack at the end of the time pulse $t_p$ based on the voltage $V_{battery,now}$, the current $I_{now}$, the current $I_{max}$, the open-circuit voltage $V_{OCV,now}$, and the open-circuit voltage $V_{OCV,end}$. Specifically, in some examples, the terminal voltage $V_{battery,end}$ may be determined by inputting the voltage $V_{battery,now}$, the current $I_{now}$, the current $I_{max}$, the open-circuit voltage $V_{OCV,now}$, and the open-circuit voltage $V_{OCV,end}$ into the equivalent circuit model. In some examples, and as described in detail below with reference to FIG. 8, the equivalent circuit model may be an RC equivalent circuit model having two RC pairs (also referred to as a second-order RC equivalent circuit model). In such examples, the terminal voltage $V_{battery,end}$ may be given as:

$$V_{battery,end} = V_{OCV,end}(SOC_{end}) + \qquad (12)$$

$$I_{max}R_0 + \sum_{i=1}^{N} I_{max}R_i\left[1 - \exp\left(-\frac{t_p}{R_iC_i}\right)\right] + V_f$$

where $R_0$ and $R_i$ are ohmic and polarization resistance parameters, respectively, of the RC equivalent circuit model, $C_i$ are polarization capacitance parameters of the RC equivalent circuit model, N is a number of RC pairs included in the RC equivalent circuit model, and $V_f$ is a voltage loss or drop ascribed to a diffusion and a charge transfer resistance of the battery pack, which may be given as:

$$V_f = V_{battery,now} - V_{OCV,now}(SOC_{now}) - I_{now}R_0 \qquad (13)$$

Equation (13) may employ parameters corresponding to the beginning of the time pulse $t_p$ (that is, the voltage $V_{battery,now}$, the open-circuit voltage $V_{OCV,now}(SOC_{now})$, and the current $I_{now}$) to determine the voltage loss $V_f$, as the voltage loss $V_f$ may not dissipate immediately with a given electrical load of the battery system. Accordingly, the voltage loss $V_f$ may have a memory effect on the terminal voltage $V_{battery,end}$ and thereby a power capability of the battery system. In this way, a terminal voltage across a battery pack in a battery system according to a current capability of a given battery component over a time pulse may be determined via an RC equivalent circuit model.

Figure 8:
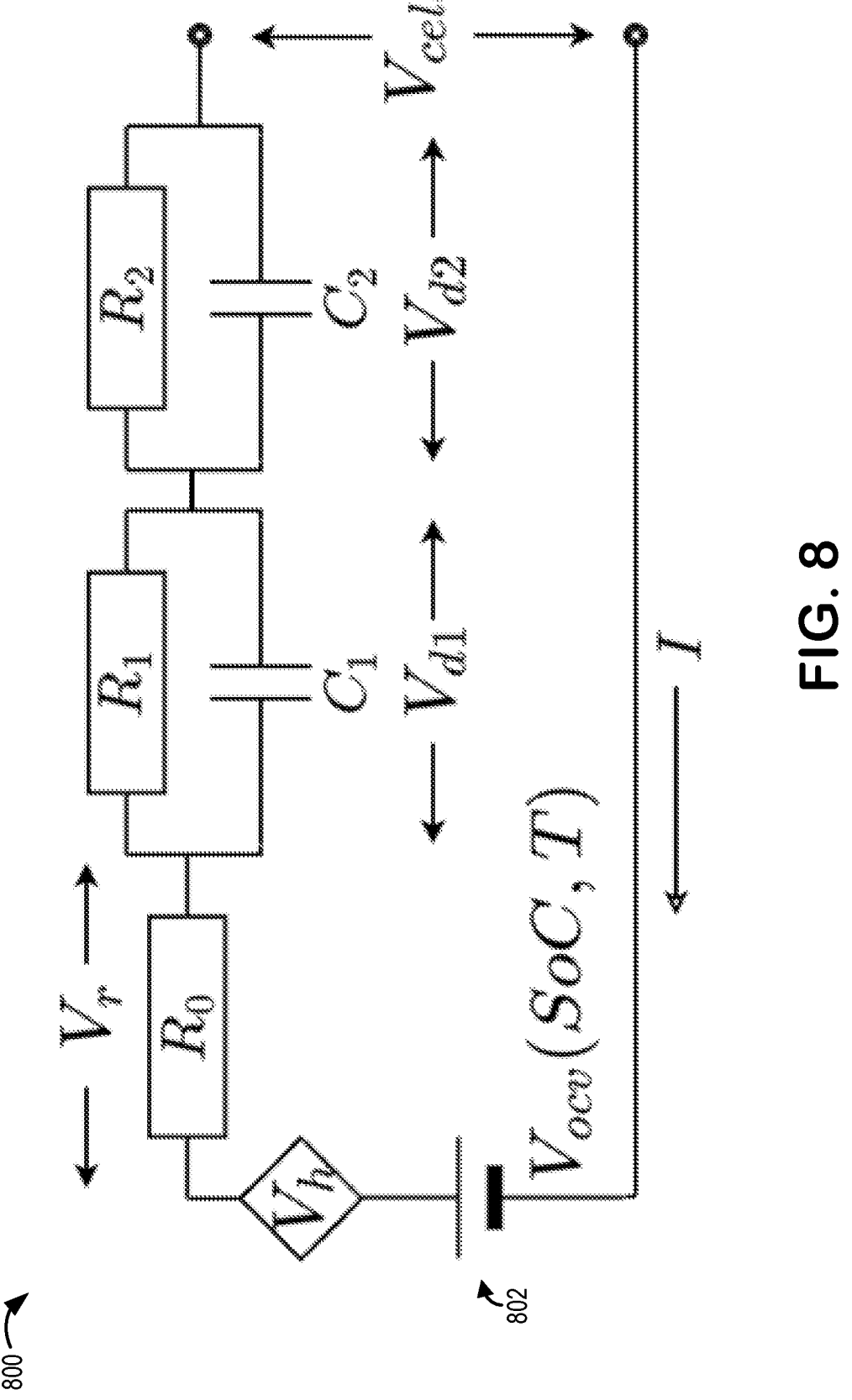
FIG. 8 shows a schematic diagram of an exemplary equivalent circuit model of a battery system.

Referring now to FIG. 8, a schematic diagram 800 illustrating an exemplary equivalent circuit model of a battery system is shown. Specifically, the exemplary equivalent circuit model may be an RC equivalent circuit model having two RC pairs (also referred to as a second-order RC equivalent circuit model). In some examples, inputs for, and outputs obtained from, the exemplary equivalent circuit model may be stored on a controller of a BMS, such as the controller 172 of the BMS 108 of FIG. 1. Accordingly, the exemplary equivalent circuit model may be employed by a predictive thermal model stored in memory, such as via the methods described herein with reference to FIGS. 4-6.

The exemplary equivalent circuit model may be employed to determine a terminal voltage $V_{cell}$ across a battery cell 802 (in a battery pack, for example) based on a plurality of inputs. Specifically, an open-circuit voltage $V_{OCV}(SOC, T)$ of the battery system and a current I flowing to the battery cell 802 may be input into the exemplary equivalent circuit model, where the open-circuit voltage $V_{OCV}(SOC, T)$ is a function of each of a state of charge SOC and a temperature T of the battery system (for example, the reference temperature $T_{ref}$ of the first component, as described above with reference to FIG. 4), and the current I is represented in the schematic diagram 800 by a directional arrow indicating a flow direction of the current I. In one example, the temperature T may be the reference temperature $T_{ref}$ of the first component of the battery system, as described above with reference to FIG. 4. Accordingly, the temperature T may be a temperature of a cell body of the battery cell 802 measured by a temperature sensor positioned at the cell body, the temperature T dynamically changing with various environmental parameters (an ambient temperature, a coolant temperature, a current load, etc.) In some examples, a voltage $V_h$ may represent a hysteresis voltage. In one example, the voltage $V_h$ may be determined via the following ODE:

$$\frac{dV_h}{dt} = -\beta |I|(V_h - \text{sign}(I)V_{h,max}) \qquad (14)$$

where $\beta$ is a decay constant and a voltage $V_{h,max}$ may be the difference between the open-circuit voltage $V_{OCV}(SOC, T)$ and the average of charge and discharge open-circuit voltage curves.

The current I may pass from the battery cell 802 to a series of resistors and capacitors. Specifically, the current I may pass through a resistor $R_0$ having a voltage $V_r$ thereacross, where $R_0$ may represent an ohmic resistance of the battery system. After passing through $R_0$, the current I may further pass through one or more RC pairs. As a non-limiting example, two RC pairs are depicted in the schematic diagram 800. However, a greater or fewer number of RC pairs may be employed, where the number of RC pairs may be selected to balance a desired accuracy of model outputs with available computational resources. Each RC pair may include a resistor and a capacitor characterized by a voltage thereacross, where the resistor and the capacitor respectively represent a polarization resistance and a polarization capacitance.

In one example, two RC pairs may be provided to account for both linear and non-linear polarization responses of the battery system. As shown in the schematic diagram 800, a first RC pair may include a first resistor having a first resistance $R_1$ and a first capacitor having a first capacitance $C_1$, the first RC pair having a first voltage $V_{d1}$ thereacross, and a second RC pair may include a second resistor having a second resistance $R_2$ and a second capacitor having a second capacitance $C_2$, the second RC pair having a second voltage $V_{d2}$ thereacross. Each of the first and second resistances $R_1$ and $R_2$ and the first and second capacitances $C_1$ and $C_2$ may be a function of one or more of battery temperature, state of charge, and current inputs. In some examples, the first and second resistances $R_1$ and $R_2$ and the first and second capacitances $C_1$ and $C_2$ may be obtained via numerical fitting of experimental test data. In HEV applications, the experimental test data may be gathered and numerically fit via a hybrid pulse power characterization test.

Referring again to FIG. 4, at 416, method 400 may include determining a maximum power $P_{max}$ manageable by the second component over the time pulse $t_p$ based on the terminal voltage $V_{battery,end}$ and the maximum current $I_{max}$. By definition, electric power is a product of a current and a voltage. Accordingly, the maximum power $P_{max}$ may be given as:

$$P_{max} = I_{max} * V_{battery,end} \qquad (15)$$

At 418, method 400 may include determining whether an actual current $I_{actual,tp}$ at the second component over the time pulse $t_p$ or an actual power $P_{actual,tp}$ at the second component over the time pulse $t_p$ is respectively requested which exceeds the maximum current $I_{max}$ or the maximum power $P_{max}$. Specifically, based on a desired current over the time pulse $t_p$ or a desired power over the time pulse $t_p$ for a given application, the actual current $I_{actual,tp}$ or the actual power $P_{actual,tp}$ may be respectively requested (e.g., by an external controller, such as a vehicle controller).

If both of the actual current $I_{actual,tp}$ and the actual power $P_{actual,tp}$ are requested less than or equal to the maximum current $I_{max}$ and the maximum power $P_{max}$, respectively, method 400 may proceed to 420, where method 400 may include maintaining current operating conditions. In some examples, maintaining current operating conditions may include the BMS maintaining the one or more battery system operating conditions determined at 402 by passing data to an external controller, such as a vehicle controller. For example, each of the actual current $I_{actual,tp}$, the actual power $P_{actual,tp}$, the maximum current $I_{max}$, and the maximum power $P_{max}$ may be transmitted to the external controller, such that one or more operating conditions of a battery-powered system (for example, an EV or HEV) may be maintained by the external controller. In such examples, the external controller may automatically maintain the one or more operating conditions of the battery-powered system. In one example, each of the BMS and the external controller may be integrated together on a single vehicle electronic control unit (ECU). Additionally or alternatively, one or more of the actual current $I_{actual,tp}$, the actual power $P_{actual,tp}$, the maximum current $I_{max}$, and the maximum power $P_{max}$ may be displayed to an operator of the battery-powered system, such that the operator may provide instructions to the external controller to maintain a current operation of the battery-powered system.

If the actual current $I_{actual,tp}$ or the actual power $P_{actual,tp}$ is requested greater than the maximum current $I_{max}$ or the maximum power $P_{max}$, respectively, method 400 may proceed to 422, where method 400 may include adjusting current operating conditions. In some examples, adjusting current operating conditions may include the BMS adjusting the one or more battery system operating conditions determined at 402 by passing data to the external controller, such that the actual current $I_{actual,tp}$ or the actual power $P_{actual,tp}$ may be respectively maintained below the maximum current $I_{max}$ or the maximum power $P_{max}$. For example, each of the actual current $I_{actual,tp}$, the actual power $P_{actual,tp}$, the maximum current $I_{max}$, and the maximum power $P_{max}$ may be transmitted to the external controller, such that the one or more operating conditions of the battery-powered system (for example, the EV or HEV) may be adjusted by the external controller to respectively maintain the actual current $I_{actual,tp}$ or the actual power $P_{actual,tp}$ below the maximum current $I_{max}$ or the maximum power $P_{max}$. In such examples, the external controller may automatically adjust the one or more operating conditions of the battery-powered system. Additionally or alternatively, one or more of the actual current $I_{actual,tp}$, the actual power $P_{actual,tp}$, the maximum current $I_{max}$, and the maximum power $P_{max}$ may be displayed to the operator of the battery-powered system, such that the operator may provide instructions to the external controller to adjust the current operation of the battery-powered system to respectively maintain the actual current $I_{actual,tp}$ or the actual power $P_{actual,tp}$ below the maximum current $I_{max}$ or the maximum power $P_{max}$.

It will be appreciated that a relative ordering of the steps of method 400 may be altered within the scope of the present disclosure and are not limited to the exemplary relative ordering depicted at FIG. 4. As an example, determining the maximum power $P_{max}$ may be responsive to requesting the actual current $I_{actual,tp}$ less than or equal to the maximum current $I_{max}$, after which it may be determined whether the actual power $P_{actual,tp}$ as requested exceeds the maximum power $P_{max}$. Accordingly, in such an example, responsive to requesting the actual current $I_{actual,tp}$ greater than the maximum current $I_{max}$, the maximum power $P_{max}$ may not be determined, and the current operating conditions may be adjusted to maintain the actual current $I_{actual,tp}$ below the maximum current $I_{max}$.

It will further be appreciated that the steps of method 400 may be substantially continuously performed by the controller while the BMS is switched ON. In some examples, the controller substantially continuously performing the steps of method 400 may include performing the steps at a predetermined frequency, such as every 100 ms.

In some examples, one or more calibratable parameters of the various equations described above may be obtained by numerically fitting the corresponding equations to either experimental testing data or high-fidelity simulations, such as computational fluid dynamics simulations. In some examples, equations (3)-(5) may be considered a transfer function between the reference temperature $T_{ref}$ and the target temperature $T_{target}$, and a dynamic response of the target temperature $T_{target}$ under a given current load may be determined (that is, the maximum current $I_{max}$), where each the transfer function and the dynamic response may be numerically fit together using a same set of experimental testing data. In one example, and as described below with reference to FIGS. 9 and 10, the set of experimental testing data may be obtained via an experimental testing and parameterization configuration simulating the ambient environment and the one or more battery system operating conditions.

Figure 9:
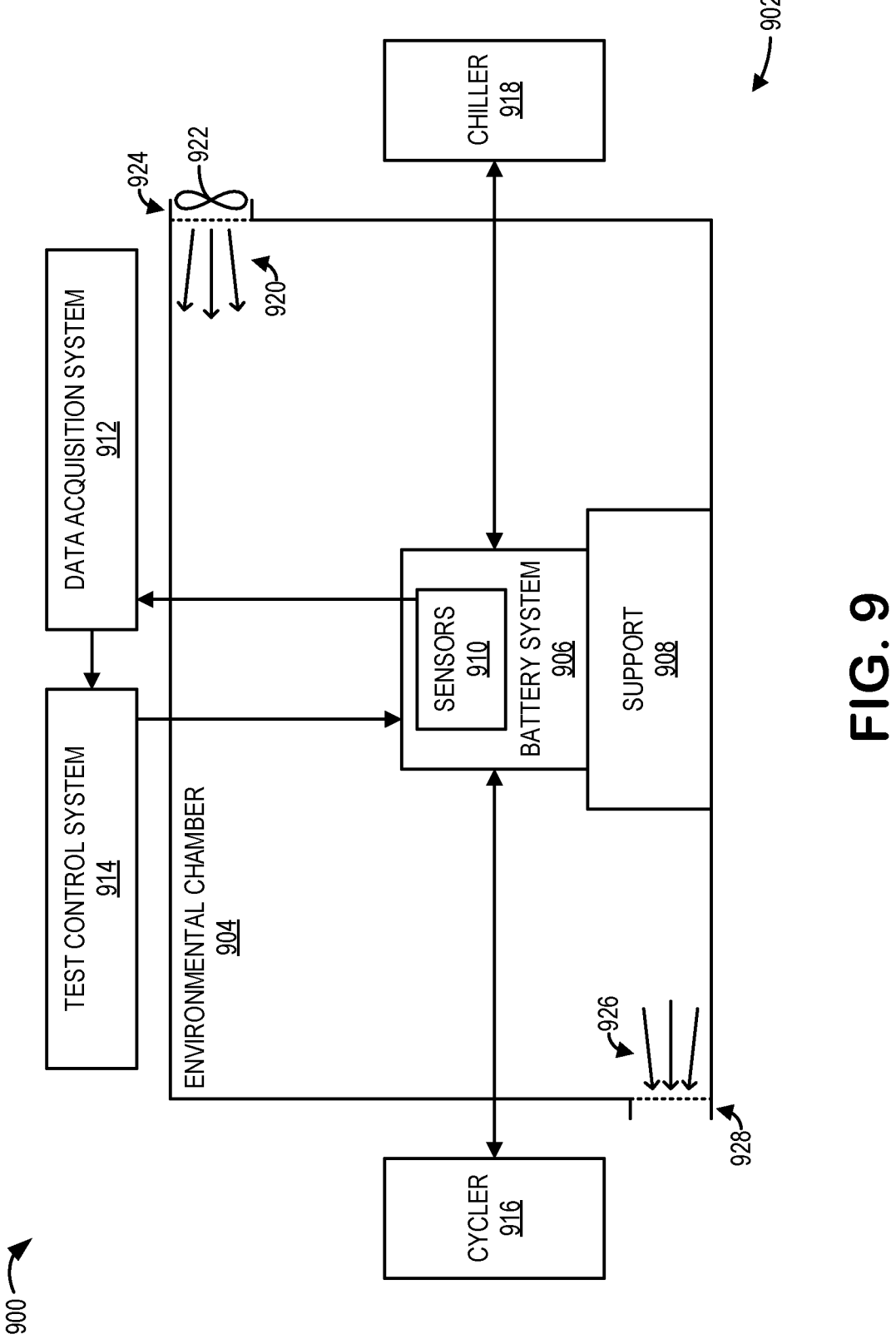
FIG. 9 shows a high-level block diagram of an exemplary experimental testing configuration for a battery system.

Referring now to FIG. 9, a high-level block diagram 900 illustrating an exemplary testing configuration 902 for a battery system 906 is shown. In some examples, the exemplary testing configuration 902 may be a controlled environment configured to simulate one or more operating conditions of the battery system 906. Specifically, the exemplary testing configuration 902 may simulate actual environmental conditions of the battery system 906, as a thermal response of components included in the battery system 906 may be dependent upon environmental factors such as a packaging of the battery system 906 and an ambient environment in which the battery system 906 is operated. Accordingly, in some examples, the exemplary testing configuration 902 may be employed to obtain a set of experimental testing data for parameterizing the various calibratable parameters described in detail above with reference to FIGS. 4-6.

As shown, the exemplary testing configuration 902 may include an environmental chamber 904 configured to control and maintain the ambient environment therein. The battery system 906 (for example, a battery pack including a plurality of lithium-ion battery cells) may be placed in the environmental chamber 904 on a support 908 (for example, a table or other raised surface composed of materials having relatively low thermal and electrical conductivity). The battery system 906 may include one or more sensors 910 for monitoring and measuring the one or more operating conditions of the battery system 906 over a testing time, where the testing time may be a sufficient duration to achieve steady-state measurements of the one or more operating conditions. As non-limiting examples, the one or more sensors 910 may include one or more temperature sensors, ammeters, and voltmeters. In one example, temperature sensors may be placed at each of a reference component and a target component included in the battery system 906, such that a predictive thermal model configured to determine a temperature of the target component based on a temperature of the reference component may be parameterized. As a first example, the reference component may be a cell body of a battery cell and the target component may be a cell tab of the battery cell. As a second example, the reference component may be a PCB and the target component may be a MOSFET positioned on the PCB.

The one or more sensors 910 may be communicably coupled to a data acquisition system 912, such that measurements taken by the one or more sensors 910 may be transmitted to, received by, and processed at, the data acquisition system 912. The data acquisition system 912 may further be communicably coupled to a test control system 914 and configured to update the test control system 914 with the processed measurements. The test control system 914 may further be communicably coupled to the battery system 906 and configured to adjust one or more operating conditions thereat based on the processed measurements.

A cycler 916 may be electrically coupled to the battery system 906 to control charge/discharge cycling thereat. Accordingly, during testing, the cycler 916 may charge and discharge the battery system 906 according to a predefined load profile. In one example, the predefined load profile may simulate an actual operating current load of a substantially similar battery system during a vehicle drive cycle. In some examples, multiple predefined load profiles (for example, for further use cases) may be employed to provide further experimental testing data for model parameterization. In some examples, a chiller or cooling system 918 may be thermally coupled to the battery system 906 to control a system temperature thereat.

In some examples, the environmental chamber 904 may control the ambient environment via dynamic air exchange therethrough. An input airflow 920 may be generated by an input source 922, such as a fan, and provided to the environmental chamber 904 via an input passage 924. Opposite the input passage 924, an output airflow 926 may exit the environmental chamber 904 via an output passage 928.

In this way, a testing configuration may be employed to collect experimental testing data used to empirically extract calibratable parameters for predictive thermal modeling of a battery system. Specifically, an optimization algorithm may be used to numerically fit the experimental testing data to the various equations of a predictive thermal model to obtain the calibratable parameters.

Figure 10:
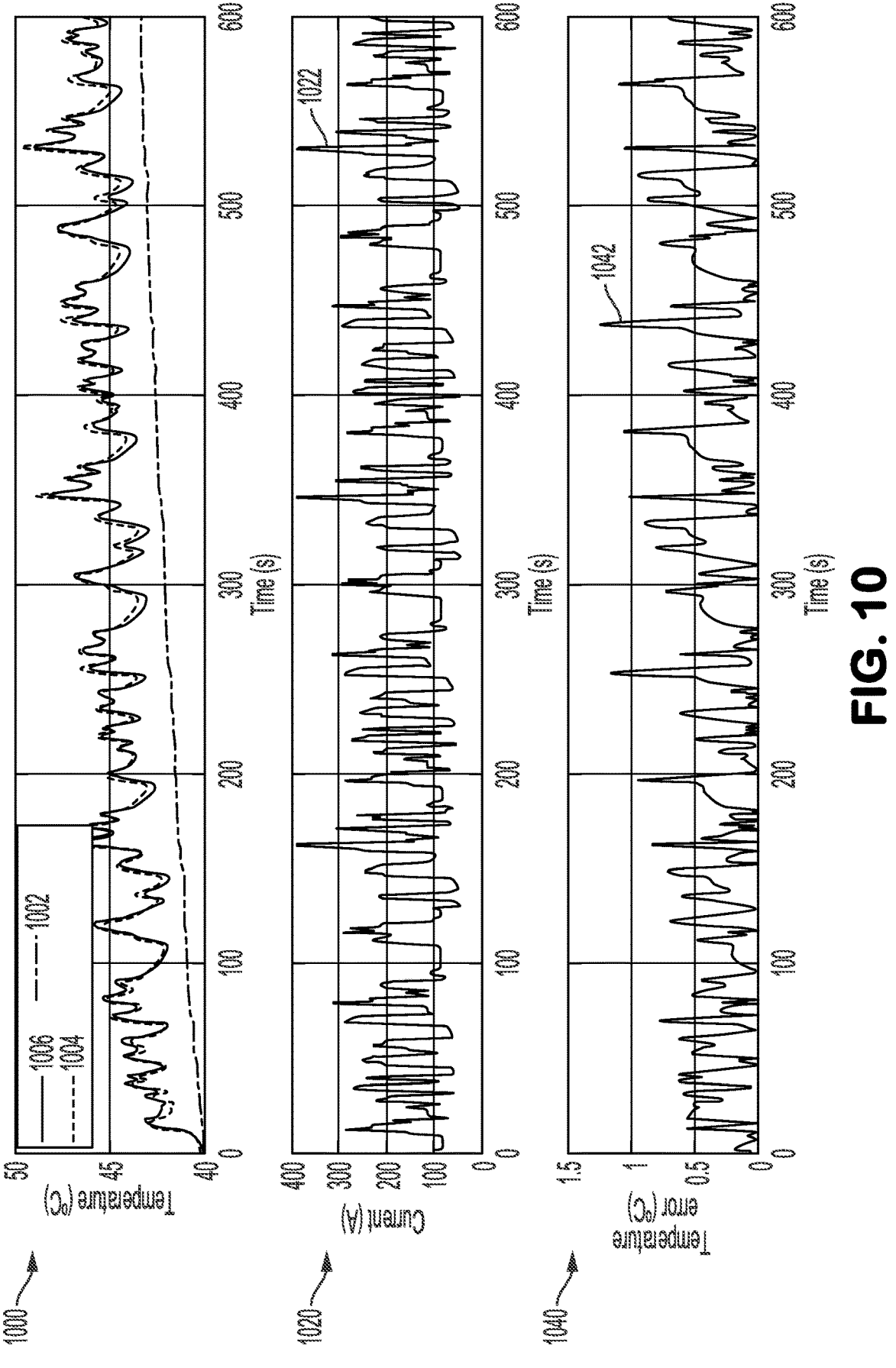
FIG. 10 shows plots comparing a predicted target temperature to each of a reference temperature, a current, and an actual target temperature.

Referring now to FIG. 10, plots 1000, 1020, and 1040 comparing a predicted target temperature of a target battery component to each of a measured reference temperature of a reference battery component, a current at the target battery component, and a measured target temperature of the target battery component are shown. Specifically, the predicted target temperature may be determined by the predictive thermal model of the present disclosure (for example, at steps 402, 404, and 406 of method 400, as described in detail above with reference to FIG. 4). In some examples, each of the target battery component and the reference battery component may be included in a battery system and may be thermally coupled to one another. In one example, the reference component may be a cell body of a battery cell, the target component may be a cell tab of the battery cell, and the battery system may be the battery system 906 of FIG. 9.

As shown, a temperature (in ° C.) is represented by an ordinate of the plot 1000, a current (in mA) is represented by an ordinate of the plot 1020, and a temperature error (in ° C.) is represented by an ordinate of the plot 1040, and time (in s) is represented by each abscissa of the plots 1000, 1020, and 1040. In the plot 1000, a curve 1002 depicts the measured reference temperature, a curve 1004 depicts the measured target temperature, and a curve 1006 depicts the predicted target temperature. In the plot 1020, a curve 1022 depicts the current. In the plot 1040, a curve 1042 depicts a temperature error between the measured target temperature and the predicted target temperature.

As the measured reference temperature (curve 1002) is steadily ramped, the measured target temperature (curve 1004) correspondingly rises, oscillating with the current (curve 1022). The predicted target temperature (curve 1006) closely follows the measured target temperature at less than 2° C., as indicated by the temperature error (curve 1042). Accordingly, the predictive thermal model of the present disclosure may accurately predict a dynamic temperature relationship between an unmonitored target component and a monitored reference component.

In this way, a predictive thermal model is provided for determining current and power capabilities of a thermally unmonitored component of a battery system. Specifically, a target temperature of the thermally unmonitored component may be estimated based on a reference temperature of a thermally monitored component thermally coupled to the thermally unmonitored component, the thermally unmonitored component being different from the thermally monitored component. In some examples, the reference temperature may be measured by a temperature sensor. In additional or alternative examples, the target temperature may be difficult to measure, as placement of a temperature sensor at the thermally unmonitored component may be impractical. A technical effect of estimating the target temperature based on the reference temperature is that the predictive thermal model may be generalized to any thermally unmonitored component thermally coupled to a thermally monitored component in the battery system. The target temperature may then be used to determine the current and power capabilities of the thermally unmonitored component. If an actual current of the thermally unmonitored component or an actual power of the thermally unmonitored component is requested which exceeds the determined current or power capability, respectively, then an operating state of the battery system may be altered to reduce the actual current or the actual power and concomitantly reduce the target temperature. A technical effect of altering the operating state of the battery system is that one or more sources of potential overheating may be ameliorated without any additional components (such as external cooling systems).

In one example, a method comprises measuring a reference temperature of a first component of a battery-powered system, correlating a target temperature of a second component of the battery-powered system to the reference temperature, determining a maximum current manageable by the second component over a predetermined duration based on the target temperature, and responsive to an actual current at the second component being requested greater than the maximum current during the predetermined duration, adjusting one or more operating conditions of the battery-powered system to maintain the actual current below the maximum current. A first example of the method further comprises determining a maximum power manageable by the second component over the predetermined duration based on the maximum current; and responsive to an actual power at the second component being requested greater than the maximum power during the predetermined duration, adjusting the one or more operating conditions of the battery-powered system to maintain the actual power below the maximum power. A second example of the method, optionally including the first example of the method, further includes wherein determining the maximum power is responsive to the actual current at the second component being requested less than or equal to the maximum current during the predetermined duration. A third example of the method, optionally including one or more of the first and second examples of the method, further comprises, responsive to the actual current at the second component being requested less than or equal to the maximum current during the predetermined duration and the actual power at the second component being requested less than or equal to the maximum power during the predetermined duration, maintaining the one or more operating conditions of the battery-powered system. A fourth example of the method, optionally including one or more of the first through third examples of the method, further includes wherein determining the maximum power manageable by the second component over the predetermined duration based on the maximum current comprises: receiving a first voltage at a beginning of the predetermined duration; predicting a second voltage of the battery-powered system at an end of the predetermined duration based on the first voltage and the maximum current; and determining the maximum power manageable by the second component over the predetermined duration based on the second voltage and the maximum current. A fifth example of the method, optionally including one or more of the first through fourth examples of the method, further includes wherein the second voltage is predicted by inputting each of the maximum current and the first voltage into an equivalent circuit model of the battery-powered system. A sixth example of the method, optionally including one or more of the first through fifth examples of the method, further includes wherein determining the maximum current manageable by the second component over the predetermined duration comprises solving a first-order ordinary differential equation. A seventh example of the method, optionally including one or more of the first through sixth examples of the method, further includes wherein solving the first-order ordinary differential equation comprises: responsive to an electrical resistance of the second component or a thermal resistance of the second component being substantially temperature dependent, iteratively solving the first-order ordinary differential equation; and responsive to each of the electrical resistance and the thermal resistance being substantially independent of temperature, analytically solving the first-order ordinary differential equation. An eighth example of the method, optionally including one or more of the first through seventh examples of the method, further includes wherein the first component is different from the second component.

In another example, a vehicle battery system comprises a battery pack, the battery pack comprising a plurality of secondary battery cells, a printed circuit board assembly (PCBA), the PCBA comprising an array of cutoff circuits electrically coupled to the plurality of secondary battery cells, at least one temperature sensor positioned on one or both of the battery pack and the PCBA, and a controller configured to receive feedback from the at least one temperature sensor, the controller being communicably coupled to a memory storing machine readable instructions executable by the controller to receive, from the at least one temperature sensor, feedback indicative of a reference temperature at a first external battery component, estimate a target temperature of a second external battery component based on the reference temperature, and alter one or more operating conditions of the vehicle battery system based on the target temperature, wherein the first external battery component is thermally coupled to the second external battery component. A first example of the vehicle battery system further comprises an ammeter electrically coupled to a positive supply line of the battery pack, wherein the controller is further configured to receive feedback from the ammeter, wherein the machine readable instructions are further executable to: receive, from the ammeter, feedback indicative of a battery current flowing from the battery pack; and determine an effective current at the second external battery component based on the battery current flowing from the battery pack, and wherein estimating the target temperature is further based on the effective current. A second example of the vehicle battery system, optionally including the first example of the vehicle battery system, further includes wherein altering the one or more operating conditions of the vehicle battery system based on the target temperature is responsive to a battery current greater than a maximum current manageable by the second external battery component over a time pulse being requested, the maximum current being predicted based on the target temperature. A third example of the vehicle battery system, optionally including one or more of the first and second examples of the vehicle battery system, further comprises a voltmeter electrically coupled to each of the positive supply line and a ground return line of the battery pack, wherein the controller is further configured to receive feedback from the voltmeter, wherein the machine readable instructions are further executable to: receive, from the voltmeter, feedback indicative of a potential difference across the battery pack; and predict a maximum power manageable by the second external battery component over the time pulse based on the maximum current manageable by the second external battery component over the time pulse, the battery current flowing from the battery pack, and the potential difference, and wherein altering the one or more operating conditions of the vehicle battery system based on the target temperature is further responsive to each of a battery current less than or equal to the maximum current manageable by the second external battery component over the time pulse being requested and a battery power greater than the maximum power manageable by the second external battery component over the time pulse being requested. A fourth example of the vehicle battery system, optionally including one or more of the first through third examples of the vehicle battery system, further includes wherein the first external battery component is a cell body of one of the plurality of secondary battery cells and the second external battery component is a cell tab of the one of the plurality of secondary battery cells. A fifth example of the vehicle battery system, optionally including one or more of the first through fourth examples of the vehicle battery system, further includes wherein the first external battery component is a surface of the PCBA and the second external battery component is a cutoff circuit in the array of cutoff circuits.

In yet another example, a battery management system, comprising a temperature sensor, a current detection circuit, and a driver integrated circuit communicably coupled to each of the temperature sensor and the current detection circuit, the driver integrated circuit comprising a logic subsystem and a memory, the memory storing computer readable instructions executable by the logic subsystem to receive feedback indicative of one or more measured currents from the current detection circuit, receive feedback indicative of a reference temperature from the temperature sensor, predict a target temperature of a battery component based on the reference temperature and the one or more measured currents, determine each of a maximum current manageable by the battery component and a maximum power manageable by the battery component, and responsive to determining a requested current surpassing the maximum current over a time pulse duration or a requested power surpassing the maximum power over the time pulse duration, adjust an operating state to respectively reduce an actual current or an actual power, wherein the reference temperature and the target temperature are measured at different positions, and wherein the requested current or the requested power is determined for the battery component. A first example of the battery management system further includes wherein each of the one or more measured currents is measured at a separate time step prior to or at a beginning of the time pulse duration, and wherein predicting the target temperature of the battery component based on the reference temperature and the one or more measured currents comprises: determining an effective current passing through the battery component by weighting the one or more measured currents; and predicting the target temperature of the battery component based on the reference temperature and the effective current. A second example of the battery management system, optionally including the first example of the battery management system, further comprises a voltage detection circuit communicably coupled to the driver integrated circuit, wherein the computer readable instructions are further executable to receive feedback indicative of a voltage from the voltage detection circuit, and wherein determining each of the maximum current and the maximum power comprises: determining the maximum current based on the target temperature; and determining the maximum power based on the maximum current, the one or more measured currents, and the voltage. A third example of the battery management system, optionally including one or more of the first and second examples of the battery management system, further includes wherein determining each of the maximum current and the maximum power is continuously performed at a predetermined frequency while the battery management system is switched ON. A fourth example of the battery management system, optionally including one or more of the first through third examples of the battery management system, further includes wherein the battery component is inaccessible for placement of the temperature sensor.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A battery management system of a battery system, comprising:
   a temperature sensor;
   a current detection circuit; and
   a driver integrated circuit communicably coupled to each of the temperature sensor and the current detection circuit, the driver integrated circuit comprising a logic subsystem and a memory, the memory storing computer readable instructions executable by the logic subsystem to:

measure one or more currents using the current detection circuit;

measure a reference temperature of a first component of the battery system using the temperature sensor;

predict a target temperature of a second component of the battery system based on the reference temperature, a calibratable gain factor, and the one or more measured currents;

determine based on the predicted target temperature of the second component, an electrical resistance of the second component, and a thermal resistance between the second component and an ambient environment, each of a maximum current manageable by the second component and a maximum power manageable by the second component; and automatically adjust operating conditions of the battery system to respectively reduce an actual current or an actual power of the second component and concomitantly reduce a temperature of the second component in response to a request for current surpassing the determined maximum current over a time pulse duration and/or a request for power surpassing the determined maximum power over the time pulse duration, wherein the reference temperature of the first component is measured at a position that does not spatially overlap with a position of the second component, and wherein the requested current or the requested power is determined for the second component.

2. The battery management system of claim 1, wherein each of the one or more measured currents is measured at a separate time step prior to or at a beginning of the time pulse duration, and wherein predicting the target temperature of the second component based on the reference temperature and the one or more measured currents comprises:

determining an effective current passing through the second component by weighting the one or more measured currents; and predicting the target temperature of the second component based on the reference temperature and the effective current.

3. The battery management system of claim 1, further comprising a voltage detection circuit communicably coupled to the driver integrated circuit, wherein the computer readable instructions are further executable to measure a voltage using the voltage detection circuit, and wherein determining each of the maximum current and the maximum power comprises:

determining the maximum current based on the target temperature; and determining the maximum power based on the maximum current, the one or more measured currents, and the voltage.

4. The battery management system of claim 1, wherein determining each of the maximum current and the maximum power is continuously performed at a predetermined frequency while the battery management system is switched ON.

5. The battery management system of claim 1, wherein the second component is inaccessible for placement of the temperature sensor.

6. A battery management system of a battery system, comprising:

a temperature sensor;

a current detection circuit; and a driver integrated circuit communicably coupled to each of the temperature sensor and the current detection circuit, the driver integrated circuit comprising a logic subsystem and a memory, the memory storing computer readable instructions executable by the logic subsystem to:

measure a reference temperature of a first component of the battery system using the temperature sensor;

measure a measured current at a second component of the battery system using the current detection circuit, wherein the second component is not accessible for placement of a temperature sensor;

determine an effective current at the second component based on the measured current, wherein the effective current is a filtered current determined via a low-pass filter for a time following when the measured current is measured;

estimate a target temperature of the second component based on the reference temperature of the first component and the effective current of the second component;

using the target temperature, an electrical resistance of the second component, and a thermal resistance between the second component and an ambient environment, determine a maximum current and/or maximum power manageable by the second component over a predetermined duration to maintain the second component below a maximum temperature; and automatically adjust operating conditions of the battery system in response a request for current to the second component surpassing the maximum current to maintain an actual current at the second component below the maximum current and concomitantly reduce a temperature of the second component in response to a request for current surpassing the determined maximum current over a time pulse duration and or a request for power surpassing the determined maximum power over the time pulse duration.

7. The battery management system of claim 6, wherein the effective current is a filtered current determined via a low-pass filter for a time following when the measured current is measured.

8. A battery management system of a battery system, comprising:

a temperature sensor coupled to a first component;

a current detection circuit; and a driver integrated circuit communicably coupled to each of the temperature sensor and the current detection circuit, the driver integrated circuit comprising a logic subsystem and a memory, the memory storing computer readable instructions executable by the logic subsystem to:

estimate a target temperature of a second component of the battery system based on a temperature of the first component measured by the temperature sensor;

based on the target temperature, an electrical resistance of the second component, and a thermal resistance between the second component and an ambient environment, determine a maximum current and/or maximum power manageable by the second component over a predetermined duration to maintain the second component below a maximum temperature; and automatically adjust operating conditions of the battery system in response a request for current to the second component surpassing the maximum current to maintain an actual current at the second component below the maximum current and concomitantly reduce a temperature of the second component in response to a request for current surpassing the determined maximum current over a time pulse duration and or a request for power surpassing the determined maximum power over the time pulse duration.

\* \* \* \* \*